US011120205B2

(12) United States Patent
Gupta et al.

(10) Patent No.: US 11,120,205 B2
(45) Date of Patent: Sep. 14, 2021

(54) REVIEWING DOCUMENT DESIGNS

(71) Applicant: Adobe Inc., San Jose, CA (US)

(72) Inventors: Sakshi Gupta, Jaipur (IN); Suryasis Paul, Noida (IN); Abhinav Kaushik, Shahadara (IN); Abhinav Kumar Agarwal, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/564,651

(22) Filed: Sep. 9, 2019

(65) Prior Publication Data

US 2021/0073324 A1 Mar. 11, 2021

(51) Int. Cl.
*G06F 40/169* (2020.01)
*G06F 40/106* (2020.01)

(52) U.S. Cl.
CPC .......... *G06F 40/169* (2020.01); *G06F 40/106* (2020.01)

(58) Field of Classification Search
CPC .............................. G06F 17/00; G06F 40/169
See application file for complete search history.

(56) References Cited

U.S. PATENT DOCUMENTS

| | | | | |
|---|---|---|---|---|
| 2004/0237041 A1* | 11/2004 | Koike et al. | ............ | G06F 17/21 |
| 2005/0091576 A1* | 4/2005 | Relyea et al. | ........... | G06F 17/00 |
| 2005/0289452 A1* | 12/2005 | Kashi et al. | ............ | G06F 17/24 |
| 2014/0317488 A1* | 10/2014 | Lutz | ...................... | G06F 17/241 |
| 2016/0092422 A1* | 3/2016 | Maglieri et al. | ........ | G06F 17/24 |
| 2017/0200122 A1* | 7/2017 | Edson et al. | ............ | G06F 21/62 |
| 2018/0357206 A1* | 12/2018 | Biswas et al. | ........ | G06F 17/212 |

* cited by examiner

*Primary Examiner* — James J Debrow
(74) *Attorney, Agent, or Firm* — FIG. 1 Patents

(57) ABSTRACT

In implementations of reviewing document designs, a document review system can import reviewer comments to a design application used to author a document design. The reviewer comments can be made by a reviewer via a review application implemented on an additional computing device other than the computing device implementing the design application. The document review system can add, via the design application, a reply comment to the reviewer comment. The reply comment can be made by a designer of the document design as part of a comment hierarchy that indicates comment sequences and comment links for the document design. The document review system can also export, to the review application, a review document representing the document design that preserves the comment hierarchy in the document design.

20 Claims, 12 Drawing Sheets

Poihsdg sdflk ad yasldgjk. Gzdgaj kljqsr ftjyu afadgq sdaf wndfj jkahsf rewu. Fafjg ghjpqaf kljwsjf er asf adfsqaf et pouha whfp klxhf.

1. Adc pdgke sgsjkgswk ijglq wefnfn sdgzmaz ssfg
2. akvxl isf: $A = \pi r^2$ alfa; i) qerr, ii) glotfg, iii) akjhgfi.
3. Phabfvl hakfg aiufg. Frql sdgj afqlkjaer ftuhj. Ag
4. aljfas, Bgs Mjsqu et Nbasfb. Bqe yasr krla sdj.

5. Lasfh jwe afigqwoer afs. Asdf oiy trquj et asd. Agy
6. lafk yrq mafp. Aaffadfa htep afkl yer. Gypafk sgkkl
7. hdfjkh kfkj mhjgfdr er gfiy.

Akjsfh wefbla ghqiop ur asodf. Phivb akjf kwhdfg lkjh ajgh. Poiyh kgup ahsfg. Jsdg oiwyf er kljg oiywjk.

FIG. 3

Figure 7:
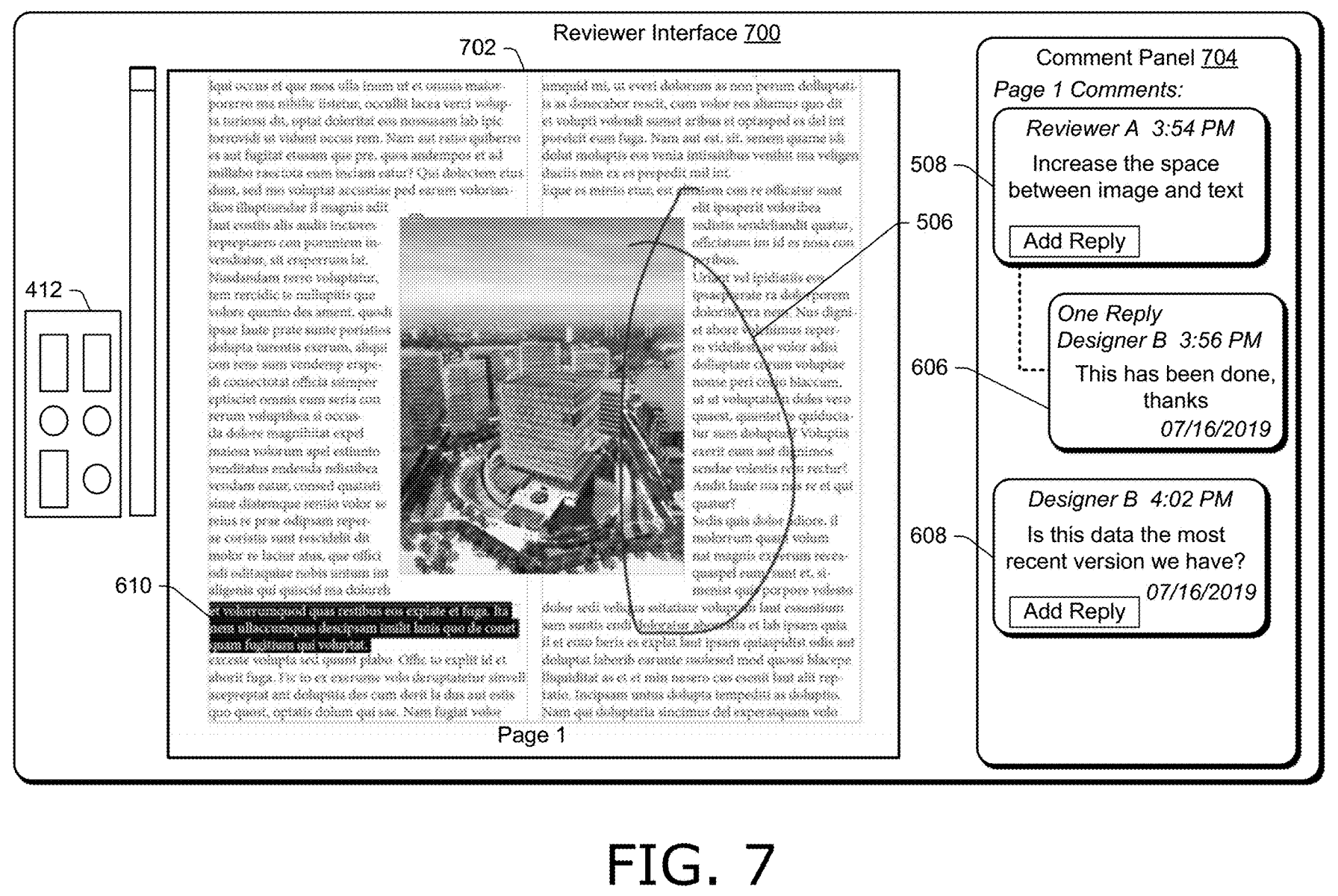

Comment Panel 704

Page 1 Comments:

Reviewer A 3:54 PM
Increase the space between image and text
[Add Reply]

One Reply
Designer B 3:56 PM
This has been done, thanks
07/16/2019

Designer B 4:02 PM
Is this data the most recent version we have?
07/16/2019
[Add Reply]

Reviewer Interface 700

Page 1

Export, to a review application implemented on an additional computing device, a document in a file format that is viewable with the review application and unviewable with a design application used to generate a document design that defines a layout of the document
1102

Import, to the document design in the design application, a reviewer comment made via the review application to the document in the file format
1104

Add a designer comment or a reply comment as part of a comment hierarchy in the document design, the comment hierarchy indicating comment sequences and comment links for the document design
1106

Export, to the review application, the document in the file format with the comment hierarchy that includes the designer comment or the reply comment in relation to the reviewer comment
1108

FIG. 11

REVIEWING DOCUMENT DESIGNS

BACKGROUND

Many designer-reviewer workflows involve a designer who works with a design application to author a document design, and a reviewer who works with a review application that is different from the design application to review a review document generated from the document design. As an example, a designer may author a document design for a magazine in Adobe's InDesign®, and provide a portable document format (PDF) version of the magazine to a reviewer who reviews the PDF document in Adobe's Acrobat® application. The reviewer may provide comments in the PDF document via the review application, and the designer may import the comments into the design application. The designer, however, is not able to communicate with the reviewer with comments (e.g., reply comments to the reviewer comments) from within the design application. Rather, the commenting is unidirectional, flowing from the reviewer and the review application to the designer and the design application.

Since the designer is not able to edit the document design outside the design application, the designer must either edit the document design in the design application based on the reviewer comments and initiate another round of review, or leave the design application and provide comments to the reviewer outside the design application, such as via email, a web-based review service, or in the PDF document via the review application. Not only is this inefficient for the designer and can cause delays in the review workflow, but because the designer is not able to express their comments from within the design application, the designer may not be able to provide comments within the context of the document design, thereby limiting the effectiveness of the designer's comments.

Moreover, when comments are imported from a review document into the design application and a designer revises a document design based on the comments and then exports the revised document design to another version of the review document, the comments are usually treated as independent comments. Consequently, a reply comment to a reviewer comment may be exported to the review document without an indication that links the reply comment as a reply to the reviewer comment.

Accordingly, conventional document review systems are inefficient for both the designer and reviewer, in terms of time and effort required to communicate comments and generate a document design. These inefficiencies may burden the designer or reviewer to the extent that when using conventional document review systems, they settle for a sub-standard document design in terms of quality.

SUMMARY

Techniques and systems are described for reviewing document designs. A document review system is implemented for bidirectional commenting between a design application used to author a document design and a review application used to provide reviewer comments on a review document generated from the document design, such as a PDF document. A designer may author the document design in the design application and use the document review system to export the document design and generate the review document (e.g., PDF document), which may not be viewable in the design application. A reviewer may make reviewer comments to the review document via the review application, and the document review system can import the reviewer comments into the design application from the review document by associating the reviewer comments with a destination of the document design in the design application, such as an indicator of a page, an object displayable in the document design, or text of the document design.

The designer can add comments from within the design application, including reply comments to reviewer comments and designer comments that can be separate from a reviewer comment. Comments made by designers can include a free-form drawing on a document design, e.g., a path drawn via a mouse or drawing tool, or a designation of a point. Additionally or alternatively, comments can include an indication of a text range in the document design, such as a highlight, strike-through, or underline of text in the text range. When the designer uses the document review system to export the document design and generate the review document, the document review system preserves the comment hierarchy of the document design, including sequences of comments and links between the comments. The document review system can also map the text ranges and free-form drawings from a coordinate system of the design application to a coordinate system of the review document, so that the free-form drawings and text ranges from the document design are accurately represented in the review document.

In one example, the document review system is implemented as an on-line system that operates in real time, allowing a designer to author a document design via a design application and a reviewer to simultaneously review a review document corresponding to the document design via a review application. The design application and the review application can be coupled to a web-interface through which comments can be shared between the design application and the review application in real time, with no perceptible delay to the designer or reviewer.

Hence, the document review system facilitates bidirectional commenting in which a designer is not required to leave the design application, and the reviewer can review the review document in a preferred format, such as PDF. The comment hierarchy is preserved between the design application and the review application, and annotations such as free-form drawing paths and indications of text ranges are accurately rendered in both the document design and the review document. Accordingly, the document review system is more efficient than conventional document review systems, and may therefore allow designers and reviewers to generate higher-quality document designs than those generated with conventional document review systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 illustrates an example document design in accordance with one or more aspects of the disclosure.

FIGS. 4-8 illustrate example user interfaces in accordance with one or more aspects of the disclosure.

FIG. 11 illustrates a flow diagram depicting an example procedure in accordance with one or more aspects of the disclosure.

DETAILED DESCRIPTION

Overview

Figure 1:
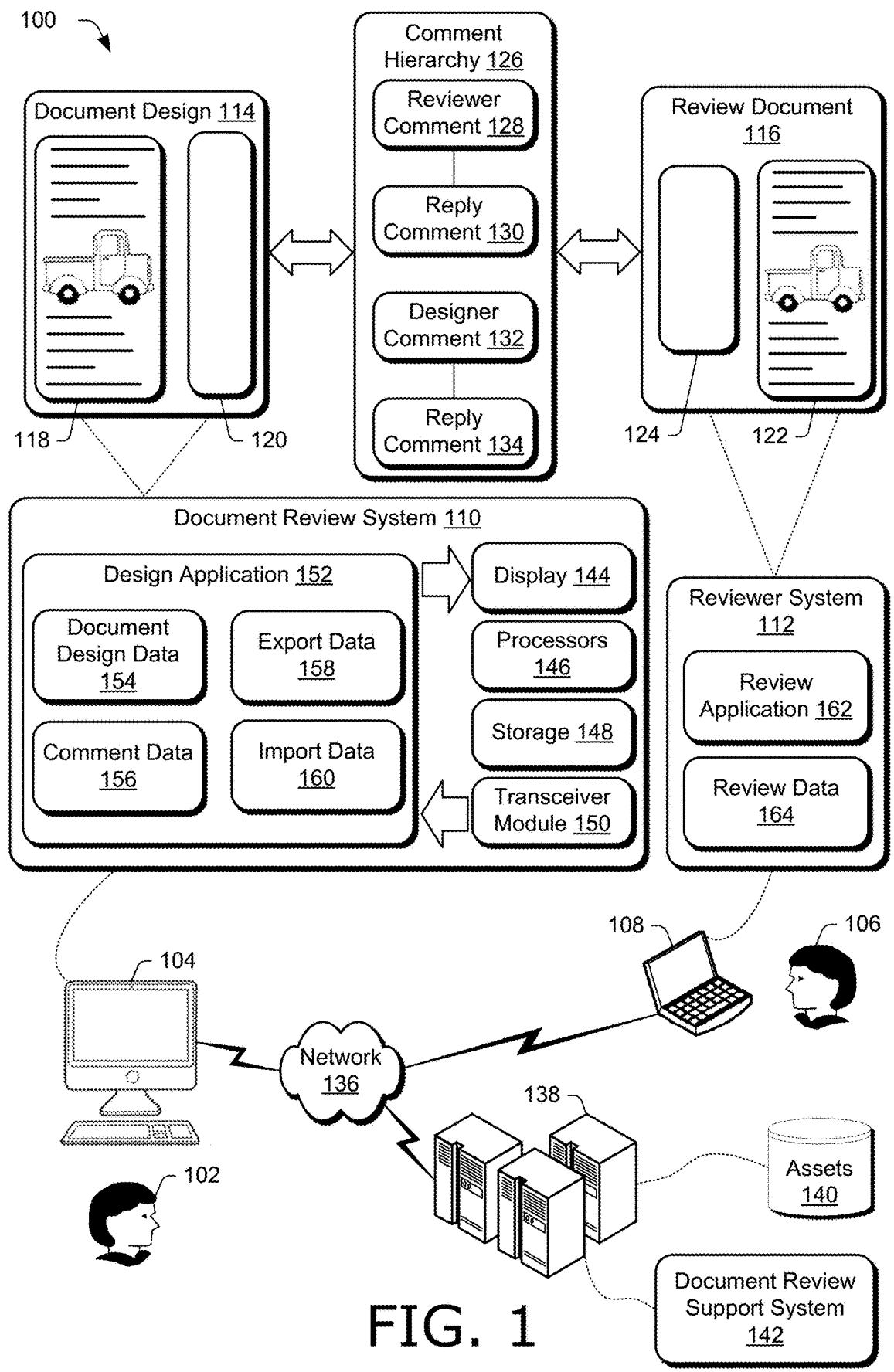
FIG. 1 illustrates a digital medium environment in an example implementation that is operable to employ techniques described herein.

Conventional document review systems are limited to unidirectional commenting in which a reviewer can make comments to a review document in a review application, but a designer is not able to make comments to a document design in a design application to communicate with the reviewer. For instance, a designer may author a document design for a magazine in Adobe's InDesign®, and provide a portable document format (PDF) version of the magazine as a review document to a reviewer who reviews the PDF review document in Adobe's Acrobat® application. Conventional document review systems facilitate the reviewer being able to make comments in the review document via the review application, but do not facilitate the designer being able to make comments (e.g., reply comments to the reviewer comments) from within the design application. Instead, conventional document review systems require that the designer edit the document design in the design application and initiate another round of review, or leave the design application and provide comments to the reviewer outside the design application, such as via email, a web-based review service, or in the PDF document via the review application. Moreover, when comments are imported into the design application or exported from the design application, conventional document review systems do not preserve the comment hierarchy (e.g., the sequence of comments and links between the comments, such as a link indicating that a reply comment is made in reply to a reviewer comment).

Therefore, conventional document review systems are inefficient because they require significant effort on behalf of the designer to communicate comments with the reviewer, and can induce significant delays into the review workflow, such as days or weeks, depending on the availabilities of the designer and reviewer. Moreover, conventional document review systems can result in poor quality document designs since comment hierarchies are not preserved between the document design and the review document, causing a comment to be skipped or overlooked due to human error. Furthermore, a designer or reviewer may become burdened by the effort required to communicate with comments via conventional document review systems, and thus settle for sub-standard designs.

Accordingly, this disclosure describes systems, devices, and techniques for reviewing document designs with bidirectional commenting between a design application used to author a document design and a review application used to provide reviewer comments on a review document generated from the document design. A document review system facilitates a designer who may author a document design in a design application and a reviewer who may review in a review application a review document generated from the document design to make comments in the design application and the review application, respectively. The document review system transfers the comments between the design application and the review application while preserving the comment hierarchy that represents an order of the comments and links between the comments.

A designer may author a document design in a design application and the document review system can export a review document, such as a PDF document corresponding to the document design, to a review application. The review document is viewable with the review application, but may not be viewable with the design application. A reviewer may make comments to the review document via the review application, and the document review system can import the reviewer comments into the design application and the document design. In one example, the document review system imports the reviewer comments into the design application from the review document by associating the reviewer comments with a destination of the document design, such as an indicator of a page, an object displayable in the document design, or text of the document design. The document review system can store comments and metadata for the comments (e.g., a destination for comments in the document design) as part of a design file for the document design. In one example, the design application corresponds to Adobe's InDesign®, and the design file includes a document object model for the document design.

The document review system facilitates the designer to add comments from within the design application, including reply comments to reviewer comments and designer comments that can be separate from a reviewer comment. Hence, the designer does not need to leave the design application to communicate reply comments to the reviewer, unlike conventional document review systems. The document review system can facilitate a designer or reviewer being able to make any suitable type of comment. In one example, a designer or reviewer can make comments that include a free-form drawing. For instance, a designer may draw on a document design with a mouse or drawing tool to denote a portion of the document design and provide commentary text regarding the portion of the document design. The comment may therefore include the commentary text as well as the path drawn to indicate the portion of the document design. The document review system can represent the path as coordinates of one or more points on the document design, such as a sequence of Cartesian coordinates that designate the path, and store the coordinates of the path as metadata of the comment. In one example, the comment includes a sticky note that is referenced to a single point of the document design.

To export comments with a free-form drawing from the design application to the review document and the review application, the document review system can map the path of the free-form drawing from a coordinate system of the design application to a coordinate system usable by the review application. In one example, the document review system applies a transformation matrix to points representing the path in the coordinate system of the design application to generate points of the path in the coordinate system usable by the review application. The document review system can provide the coordinates of the transformed path to an application protocol interface (API), and execute the API to export the comments and generate the review document. Hence, the document review system can accurately represent a path drawn on a document design on the review document generated from the document design.

Additionally or alternatively, a designer or reviewer can make comments that include an indication of a text range, such as a highlight, strike-through, or underline of text in the text range. For instance, a designer may highlight a text range in a document design and underline a portion of the text in the text range to emphasize the portion of text. The designer may also provide commentary text regarding the portion of text, such as "Does this highlighted text still describe the correct procedure for the adjustment mentioned in this paragraph?" The document review system can store the text range, portion of text, and indication of underline, highlight, or strike-through as metadata of the comment.

To export comments that include an indication of a text range from the design application to the review document and the review application, the document review system can determine bounding boxes for text in the text range, transform coordinates of the bounding boxes from a coordinate system of the design application to a coordinate system usable by the review application, and provide the transformed coordinates of the bounding boxes to an API. In one example, the document review system determines, for each line of text in the text range, sets of continuous characters having a same font height. For instance, if a line of text includes all characters of a same font and size, the document review system may determine that the line of text can be represented by one set of continuous characters corresponding to the text on the line of text. The document review system may determine that a line of text that includes an equation, however, can be represented by multiple sets of continuous characters, one for the equation and one or more for the remaining text of the line of text. The document review system then determines bounding boxes for the sets of continuous characters in each line of text and coordinates for the corners of the bounding boxes. The document review system can convert the coordinates of the corners of the bounding boxes from a coordinate system used by the design application to a coordinate system of the review document that is usable by the review application, and provide the converted coordinates to an API to export the document design with comments and generate the review document.

Additionally or alternatively, the document review system can export the document design with comments to generate the review document by determining a current page of the review document, and determining, based on the converted coordinates, which of the bounding boxes are not on the current page. To prevent comment duplication in the review document, the document review system may discard the coordinates of the corners of the bounding boxes that are not on the current page when executing the API.

In one example, the document review system is implemented as an on-line system that operates in real-time, allowing a designer to author a document design via a design application and a reviewer to simultaneously review a review document corresponding to the document design via a review application. The design application and the review application can be coupled to a web-interface through which comments can be shared between the design application and the review application with no perceptible delay to the designer or reviewer. For instance, a reviewer may provide a reviewer comment via the review application in the review document, which can be imported to the document design and displayed in the design application without perceptible delay to the designer. The designer may then provide a reply comment to the review comment via the design application, and the comment hierarchy including the reviewer comment and the reply comment can be displayed to the reviewer in the review document via the review application without perceptible delay to the reviewer. Hence, the document review system facilitates real-time document review while permitting the designer to remain using the design application and the reviewer to remain using the review application.

Hence, the document review system facilitates bidirectional commenting in which a designer can remain working in the design application, and the reviewer can review the review document in a preferred format, such as PDF. The document review system preserves the comment hierarchy when sharing comments between the design application and the review application, and comment annotations such as free-form drawing paths and indications of text ranges are accurately rendered in both the document design and the review document. Accordingly, the document review system is more efficient than conventional document review systems, and may therefore allow designers and reviewers to generate higher-quality document designs than those generated with conventional document review systems.

Term Examples

"Comment" describes any suitable annotation, text, or combination thereof added to a document design or review document by a user (e.g., a designer or reviewer). An annotation of a comment can include a selected text range, a highlight, strike-through, or underline of text, a path drawn by a user, a shape added by a user, a selection of an object, and the like. Text of a comment can include commentary text entered by a user, such as a question regarding a selected text range or image indicated in a document design or review document.

"Comment hierarchy" describes any suitable representation of comments of a document design or review document that includes a sequence of the comments and links between the comments. For example, a comment hierarchy may represent independent comments in an order based on the timestamps associated with the independent comments, and reply comments as linked to their parent comments via lines between the comments.

"Design application" describes any suitable application that can be used to author or edit a document design that defines the layout of a document. Examples of design applications include Adobe's InDesign®, Adobe's Photoshop®, Adobe's FrameMaker, Adobe's XD, Adobe's Illustrator®, AutoCAD®, Solidworks®, LaTeX, TeX, Microsoft Word®, a C-code compiler, and the like. A review document may not be viewable with a design application.

"Designer comment" describes an independent comment made by a designer. For example, a designer comment may not be in reply to another comment. A designer can add a designer comment to a document design.

"Digital medium environment" describes any combination of the various computing devices and resources that can be utilized to implement the techniques, systems, and devices described herein. For instance, a digital medium environment may include at least one or more client computing devices, a network, and one or more server computing devices.

"Document design" describes any suitable design that defines the layout of a document, such as a magazine, newspaper, web page, presentation, and the like. A document design can include text frames for placing text in the document, image frames for adding images to the document, a coordinate system for laying out objects in the document, etc. A document design can be stored as part of a design file for the document. One example of a design file that stores a document design is a document object model for Adobe's InDesign® design application.

"Drawing comment" describes any suitable comment that includes an indication of a drawing or path on a document design or review document. For example, a drawing comment can include a path drawn with a drawing tool, such as a circle, ellipse, or rectangle tool. A drawing comment can also include a free-form drawing (e.g., an unconstrained drawing) drawn by a user, such as with a stylus. A sticky comment is an example of a drawing comment in which the drawing path includes only a single point. A drawing comment can also include commentary text referencing the drawing. A designer can add a drawing comment to a document design, and a reviewer can add a drawing comment to a review document. A drawing comment can be a reply comment or an independent comment that is not in reply to a parent comment.

"Review application" describes any suitable application that can be used to review a review document generated from a document design. Examples of a review application include Adobe's Acrobat®, PDF.js for viewing PDF documents via a web browser, Nitro PDF reader, Foxit reader, JPEGview, GIMP, Pixlr, FastStone image viewer, and InViewer.

"Review document" describes any suitable document generated from a document design and in a file format viewable with a review application. A PDF document generated from a document design is an example of a review document that can be reviewed by a reviewer via a review application. Other file formats of example review documents include a bit map format, such as JPEG or GIF.

"Reviewer comment" describes a comment made by a reviewer, such as a comment added to a comment section of a PDF review document that represents a document design. A reviewer may instruct a designer to edit a document design by adding reviewer comments to a review document generated from the document design.

"Reply comment" describes any suitable comment made in reply to another comment (referred to as the parent comment of the reply comment), such as another reply comment or an independent comment. A reply comment can be made by any suitable user, including a reviewer or designer.

"Text comment" describes any suitable comment that includes an indication of a text range on a document design or review document. For example, a text comment can include a highlight, underline, or strike-through of text in the text range. A text comment can also include commentary text added by a user that references the text of the text range. A designer can add a text comment to a document design, and a reviewer can add a text comment to a review document. A text comment can be a reply comment or an independent comment that is not in reply to a parent comment.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a designer 102 operating a computing device 104 depicted as a desktop computer, and a reviewer 106 operating a computing device 108 depicted as a laptop computer. A desktop computer and a laptop computer are examples of computing devices 104 and 108, which can generally include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing devices 104 and 108 may range from full resource devices with substantial memory and processor resources (e.g., personal computers, game consoles, etc.) to low-resource devices with limited memory or processing resources (e.g., mobile devices). Generally, discussion of one of computing device 104 or computing device 108 applies to both computing devices 104 and 108.

Notably, computing device 104 can include any suitable number of computing devices, such as one or more computing devices, (e.g., a smart phone connected to a tablet). Furthermore, discussion of one computing device of computing device 104 is not limited to that one computing device, but generally applies to each of the computing devices included in computing device 104. Furthermore, computing device 104 may be representative of one or a plurality of different devices connected to a network that perform operations "over the cloud" as further described in relation to FIG. 12. In one example, computing device 104 includes multiple computing devices communicatively coupled to each other, such as with a low power wireless communication standard (e.g., a Bluetooth® protocol). Hence, an asset (e.g., document design, review document, digital image, video, text, drawing, artwork, document, file, and the like) generated, processed, edited, or stored on one device of computing device 104 (e.g., a desktop computer) can be communicated to, and displayed on and processed by another device of computing device 104 (e.g., a tablet).

Various types of input devices and input instrumentalities can be used to provide input to computing device 104. For example, computing device 104 can recognize input as being a mouse input, drawing-tool input, stylus input, touch input, input provided through a natural user interface, and the like. Thus, computing device 104 can recognize multiple types of gestures including touch gestures and gestures provided through a natural user interface. In one example, computing device 104 includes speech recognition, identification, and synthesis functionalities, microphones, and speakers that allow computing device 104 to communicate with a user in a conversation, such as with designer 102 in a user conversation.

Computing device 104 includes document review system 110 and computing device 108 includes reviewer system 112 for reviewing document designs. In the example in FIG. 1, designer 102 and reviewer 106 are participating in a document review session, such as part of an on-line document review session implemented in real time. Hence, document review system 110 displays document design 114 and reviewer system 112 displays review document 116, which is an example of a review document generated from the document design 114. For instance, the review document 116 may be a PDF document generated by exporting the document design 114 from the document review system 110. The document design 114 can be authored by the designer 102 with the design application 152 of document review system 110, and the review document 116 can be viewed by the reviewer 106 with the review application 162 of reviewer system 112 (discussed below in more detail).

The document design 114 defines the layout of a document, such as a magazine, whose content is denoted by content 118. The document design 114 also includes a comment panel 120 for displaying comments of the reviewer 106 and the designer 102. The review document 116 depicts the content 122 that corresponds to the content 118 of the document design 114, and also includes a comment panel 124. The document review system 110 shares the comment hierarchy 126 between the document design 114 viewable by the designer 102 on the computing device 104 and the review document 116 viewable by the reviewer 106 on the computing device 108. The comment hierarchy 126 can include any comments made by the designer 102 and the reviewer 106, and can display in one or both of comment panel 120 and comment panel 124 the comments in sequence (e.g., in an order based on time stamps denoting when the comments were made) and with links indicating reply comments to their respective parent comments.

For example, comment hierarchy 126 includes reviewer comment 128, reply comment 130, designer comment 132, and reply comment 134. Reviewer comment 128 is an example of a reviewer comment made by reviewer 106 in the review document 116, and reply comment 130 is an example of a comment made by the designer 102 in the document design 114 in reply to the reviewer comment 128. Hence, the reviewer comment 128 is the parent comment to the reply comment 130. To illustrate that the reply comment 130 is in response to the reviewer comment 128, the comment hierarchy 126 depicts the reply comment 130 linked with a line to the reviewer comment 128.

Designer comment 132 is an example of a comment made by the designer 102 in the document design 114 as an independent comment, e.g., a separate comment that is not in reply to a parent comment. Hence, comment hierarchy 126 depicts the designer comment without a link to a previous comment. Reply comment 134 is an example of a comment made in reply to the designer comment 132, such as a reply comment made by the reviewer 106. Hence, the comment hierarchy 126 depicts the reply comment 134 linked with a line to the designer comment 132. The comment hierarchy 126 can display comments in a sequence, with earlier independent comments displayed lower in the comment hierarchy 126 than later independent comments. Hence, the reviewer comment 128 may be made at an earlier time than the designer comment 132, since the reviewer comment 128 is displayed in the comment hierarchy 126 above the designer comment 132.

In one example, the designer 102 and the reviewer 106 view the document design 114 and the review document 116, respectively, at separate times (e.g., not simultaneously). Hence, the designer 102 and the reviewer 106 may provide comments represented in the comment hierarchy 126 at different times of day, different days, etc. Additionally or alternatively, the document review system 110 can be implemented in an on-line fashion to facilitate real-time reviewing of document designs. Hence, the comment hierarchy 126 can be populated with comments made by the designer 102 and the reviewer 106 in real-time as the comments are made, and displayed in the document design 114 via the design application 152 and the review document 116 via the review application 162 without perceptible delay to the designer 102 or the reviewer 106. Accordingly, the designer 102 and the reviewer 106 can view the document design 114 and the review document 116 simultaneously and work on the document design 114 concurrently.

The document review system 110 shares the comment hierarchy 126 between the document design 114 and the review document 116 while preserving the comment order and links between the comments. Hence, the document review system 110 facilitates the designer 102 to make comments to the document design 114 via the design application 152, rather than requiring the designer 102 to exit the design application 152 and provide comments to the reviewer 106 via external means, such as via email, a web-based review service, or in the review document 116. Accordingly, the document review system 110 is more efficient than conventional document review systems, and may thus allow designers and reviewers to generate higher-quality document designs than those generated with conventional document review systems.

Computing devices 104 and 108 are also coupled to network 136, which communicatively couples computing devices 104 and 108 with server 138. Network 136 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 138 may include one or more servers or service providers that provide services, resources, assets, or combinations thereof to computing device 104 and/or computing device 108. Services, resources, or assets may be made available from server 138 to document review system 110, reviewer system 112, or combinations thereof, and stored at assets 140 of server 138. For instance, document designs in part or in whole can be stored at assets 140 and made available to computing device 104. Hence, document design 114 can include any suitable asset stored at assets 140 of server 138.

Server 138 includes document review support system 142 configurable to receive signals from computing device 104 and/or computing device 108, process the received signals, and send the processed signals to computing device 104 and/or computing device 108 to support reviewing document designs. For instance, computing device 104 may obtain a document design (e.g., document design 114) and communicate it along with any suitable data to server 138. Server 138, using document review support system 142, may export the document design including a comment hierarchy to generate a review document. Server 138 may then send the review document to computing device 108, which can display the review document to the designer 102 who can provide comments in the comment history of the review document. The computing device 108 may then send the review document with the revised comment hierarchy to the server 138, which can use the document review support system 142 to extract the revised comment hierarchy from the review document. The server 138 can then send the revised comment hierarchy from the review document to the computing device 104, which can import the revised comment hierarchy into the document design. Accordingly, document review support system 142 of server 138 can include a copy of document review system 110 and reviewer system 112.

In one example, the document review support system 142 is implemented as a web interface for the document review system 110 and reviewer system 112. The web interface allows the designer 102 via the design application 152 to communicate with the reviewer via the review application 162 in an on-line document review session in which the designer 102 can add comments to the document design 114 and the reviewer 106 can add comments to the review document. The comments can be shared between the designer 102 and the reviewer 106 via the web interface of the document review support system 142 without perceptible delay.

Computing device 104 includes document review system 110 for reviewing document designs. Document review system 110 includes a display 144, which can expose any suitable data used by or associated with document review system 110. In one example, display 144 displays a user interface for authoring document designs, such as a designer interface for authoring document design 114 with design application 152 (discussed below in more detail). Display 144 can include any suitable type of display, such as a touchscreen, liquid crystal display, plasma display, head-mounted display, projector and screen, and the like.

Document review system 110 also includes processors 146. Processors 146 can include any suitable type of processor, such as a graphics processing unit, central processing unit, digital signal processor, processor core, combinations thereof, and the like. Hence, document review system 110 may be implemented at least partially by executing instructions stored in storage 148 on processors 146. For instance, processors 146 may execute portions of design application 152.

Document review system 110 also includes storage 148, which can be any suitable type of storage accessible by or contained in document review system 110. Storage 148 stores data and provides access to and from memory included in storage 148 for any suitable type of data. For instance, storage 148 can include data used by or generated by the design application 152.

Furthermore, document review system 110 includes transceiver module 150. Transceiver module 150 is representative of functionality configured to transmit and receive data using any suitable type and number of communication protocols. For instance, data within document review system 110 can be transmitted to server 138 or computing device 108 with transceiver module 150. Furthermore, data can be received from server 138 or computing device 108 with transceiver module 150. Transceiver module 150 can also transmit and receive data between computing devices of computing device 104. In one example, transceiver module 150 includes a low power wireless communication standard (e.g., a Bluetooth® protocol) for communicating data between computing devices of computing device 104.

Document review system 110 also includes design application 152 that represents functionality configured to author and edit document designs, such as document design 114. Design application 152 can be implemented as any type of module or component in software (e.g., as software instructions that are executable with a processors 146), hardware or combinations thereof, as a standalone application or as a module or component of another device application, and in any type of computing device. Design application 152 can include any suitable application for authoring and/or editing any suitable document design. Examples of design application 152 include Adobe's InDesign®, Adobe's Photoshop®, Adobe's FrameMaker, Adobe's XD, Adobe's Illustrator®, AutoCAD®, Solidworks®, LaTeX, TeX, Microsoft Word®, a C-code compiler, and the like.

Design application 152 can export a document design to generate a review document corresponding to the document design. The design application 152 can generate a review document in a file format (e.g., PDF, a bit map, etc.) that is viewable with a review application, such as review application 162, but may not be viewable with the design application 152. Hence, design application 152 can be implemented as part of a designer-reviewer workflow for a variety of situations in which a designer uses the design application 152 to author a document design and a reviewer reviews the document design indirectly by reviewing the review document corresponding to the document design in a review application. The review application can be a different application than the design application 152 and implemented on an additional computing device than a computing device that implements the design application 152. Examples of designer-reviewer workflows that can use design application 152 include magazine design and review, book design and review, design and review of wireframes for animation sequences, design and review of compilable computer code, such as register transfer logic (RTL) code generated from C-code in semiconductor design, design and review of a finite-element model of an object, design and review of a website, design and review of a user interface, and the like.

Design application 152 can also include or have access to any suitable data for reviewing document designs, including document design data 154, comment data 156, export data 158, and import data 160. In one example, this data is stored in storage 148 and made available to design application 152. Document design data 154 can include any suitable data related to document designs, such as text (e.g., text frames making up a text story in a document design), images, drawings, wire frames, graphics, animations, and the like that may be included in a document design. Document design data 154 can also include a design file for a document design, such as a document object model in InDesign®. The design file can include properties of the document design, such as a list of objects on each page of the document design and identifiers of the objects, an indicator of whether an object is associated with a comment, a list of events for a document design (e.g., importing text, opening and closing a document design, generating a PDF document from a document design, etc.), an indication of a coordinate system for the document design, such as an origin (zero point) location, and the like. Document design data 154 can also include designer preferences (e.g., a language preference, a preferred layout of a user interface, a preferred font, etc.), a history of edits or tools used by a designer, statistics gathered for a designer, such as a length of time a designer has a document design open in the design application 152, a designer's identification or employee number, etc. In one example, document design data 154 includes metadata for a document design, such as a version number of design application 152 used to author the document design, a filename, a date of creation, and the like.

Comment data 156 can include any suitable data related to comments for a document design, such as a comment hierarchy that represents a sequence of comments and links between the comments, an originator of a comment (e.g., a name of a reviewer or designer), an indication of whether the originator is a reviewer or designer (e.g., author) of a document design, a timestamp indicating a time when a comment was made, an indication of whether a comment is a reply comment to a parent comment or is an independent comment that is not in reply to a parent comment, an iteration number indicating a number of volleys of comments between a reviewer and a designer, etc. Comment data 156 can also include text of a comment (e.g., text entered by a designer or reviewer as part of a comment), and a designator of a portion of a document design associated with the comment, such as a sequence of points representing a path drawn by a user, text in a text range selected by a user, an object indicator (e.g., an image number or table number), a page number, a story number, combinations thereof, and the like. In one example, comment data 156 includes coordinates of corners of bounding boxes that bound a set of continuous characters of text having a same font height.

Comment data 156 can also include an indication of a type of comment, including indicators for free-form drawing comments that include a free-form drawing made by a user, sticky comments that are referenced to a single point of a document design, and text comments that reference text in a text range of the document design. Comment data 156 can also include an indication of whether a comment was made in a document design via a design application, such as design application 152, or in a review document via a review application, such as review application 162. In one example, comment data 156 includes a respective data structure for each comment. The data can be populated with any suitable content, such as an author of the comment, a timestamp for the comment, and a destination for the comment (e.g., a page number, an object number for an object displayable in the document design, story number, or text of the document design).

Export data 158 can include any suitable data related to exporting a document design, such as a comment hierarchy including a sequence of comments for the document design and links between the comments, a review document generated from a document design (e.g., a PDF document or a bit map), an indicator for a selection of a page range to be exported, and indicator for a file format of a review document (e.g., an indicator of PDF), and the like. Export data 158 can also include a representation of a transformation matrix for converting positions (e.g., Cartesian coordinates of points of a path of a free-form drawing comment or corners of bounding boxes bounding text selected in a text comment) from a coordinate system used by a document design to a coordinate system used by a review document. In one example, export data 158 includes an indication of one or more API calls used to generate a review document, and properties of comments used to populate fields of the API calls (e.g., coordinates for corners of bounding boxes bounding text selected in a text comment). An API call can include an "in reply to" (IRT) field that is populated with an indicator of a parent comment for a reply comment that is in reply to the parent comment. The export data 158 can also include an indicator of comments that have been discarded to prevent duplicated comments in a review document.

Import data 160 can include any suitable data related to importing comments from a review document, such as a comment hierarchy including a sequence of comments for the document design and links between the comments, a review document including reviewer comments made via a review application, such as review application 162, and a destination of a document design associated with a reviewer comment, such as an indicator of a page, an object displayable in the document design, a story, or text of the document design. The import data 160 can also include text of a comment entered by a user, as well as an annotation made by the user, such as a sequence of points (e.g., a path) denoting a free-form drawing made by a reviewer on the review document, or text of a text range selected by the reviewer. The annotation can include an underline, strike-through, or highlight of the text, and the import data 160 may include different designators for underline, strike-through, and highlight, such as zero to indicate a selection of text, one to indicate an underline of text, two to indicate a strike-through of text, and three to indicate a highlight of text. The import data 160 can also include metadata for a comment, including an author of a comment, a timestamp for a comment, a user-selectable priority assigned to a comment, whether a comment is in reply to another comment, an indicator of a language of user-supplied text of a comment, a page number to which a comment belongs, etc.

Reviewer system 112 can communicate with the document review system 110 via network 136 to facilitate reviewing document designs. Reviewer system 112 includes review application 162 and review data 164. Review application 162 can be implemented as any type of module or component in software (e.g., as software instructions that are executable with a processing system), hardware, or combinations thereof, as a standalone application or as a module or component of another device application, and in any type of computing device. Review application 162 represents functionality configured to review documents. For instance, review application 162 can be used by reviewer 106 to review the review document 116 corresponding to the document design 114 authored by designer 102 via the design application 152.

Review application 162 can include any suitable application for reviewing a review document. The review document can be of any suitable file format, such as PDF or a bit map of a rasterized file (e.g., JPEG or GIF). Examples of review application 162 for review documents having a PDF file format include Adobe's Acrobat®, PDF.js for viewing PDF documents via a web browser, Nitro PDF reader, and Foxit reader. Examples of review application 162 for reviewing documents having a bit-map file format include JPEGview, GIMP, Pixlr, FastStone image viewer, and InViewer.

Review data 164 can include any suitable data related to reviewing a review document, such as a comment hierarchy including a sequence of comments for the document design and links between the comments, a review document, reviewer comments, and the like. The reviewer comments can include commentary text entered by a reviewer (e.g., "Change this image"), as well as annotations made by a reviewer on a review document, such as a free-form drawing, a point, and text in a text range that is selected, highlighted, underlined, or struck-through. The review data 164 can also include a designator of review application 162 used to review a review document, such as a version number of the review application 162. In one example, the review data 164 includes a representation of a coordinate system used by a review document and review application, including a location of an origin (e.g., zero point).

Example Document Review System

Figure 2:
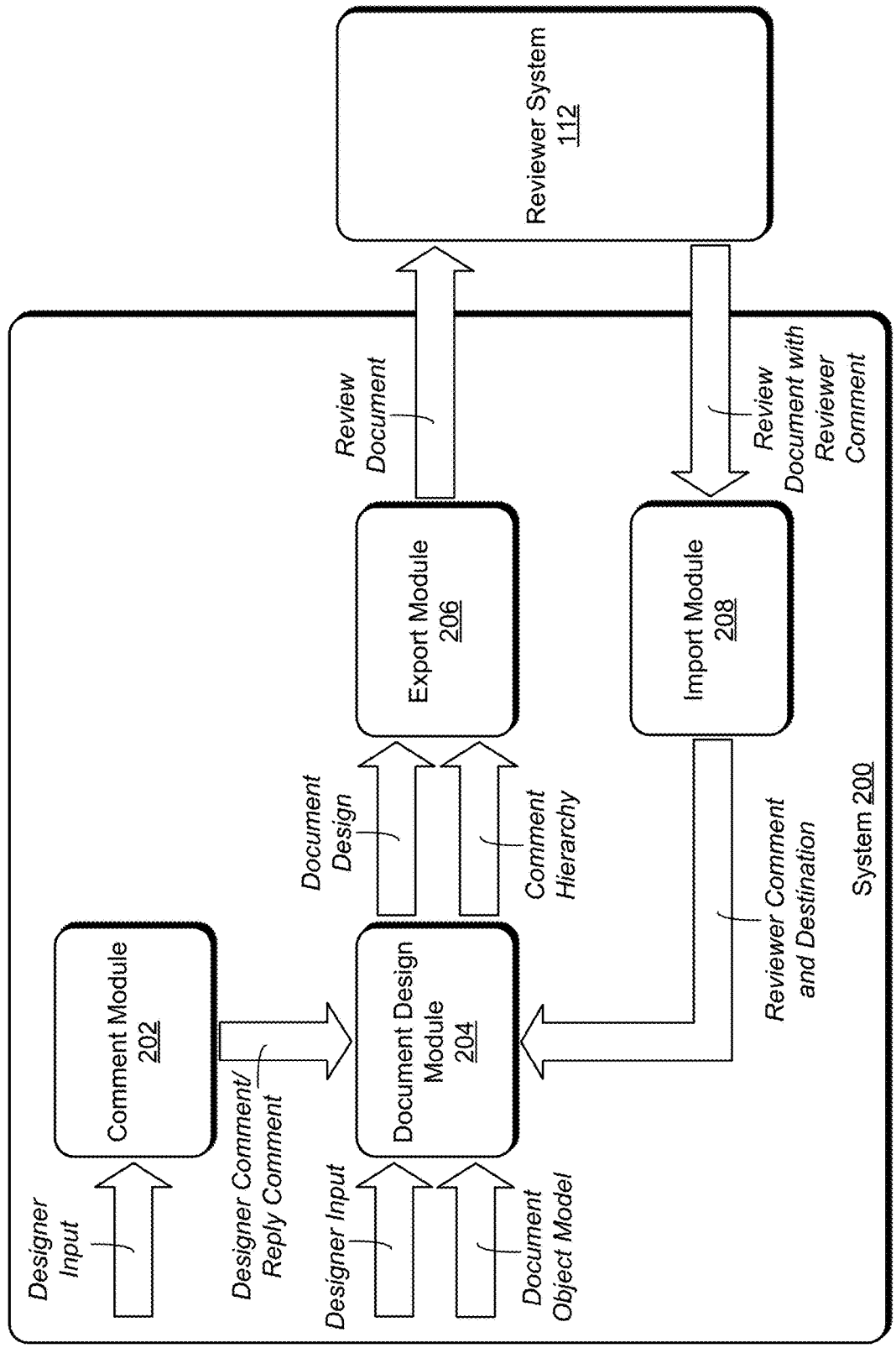
FIG. 2 illustrates an example system usable for reviewing document designs in accordance with one or more aspects of the disclosure.

FIG. 2 illustrates an example system 200 usable for reviewing document designs in accordance with one or more aspects of the disclosure. In this implementation, system 200 includes comment module 202, document design module 204, export module 206, and import module 208. These modules can be implemented as any type of module or component in software (e.g., as software instructions that are executable with a processing system), hardware, or combinations thereof, as a standalone application or as a module or component of another device application, and in any type of computing device. System 200 is one example of document review system 110 that can be constructed using these modules. For instance, signals can be redefined, and modules can be modified, combined, divided, added, or removed to form a modified system, without altering the functionality of system 200. Accordingly, such modified systems are considered to be within the scope of the disclosure. Furthermore, for simplicity, system 200 is limited to these modules and a description of some of their interconnects. System 200 can, however, include any suitable signals and communications between modules omitted for simplicity. Such signals may include system clocks, counters, document indicators, sequence indicators, page numbers, reset signals, and the like. In one example, system 200 can operate in real time (e.g., with no perceptible delay to a user). Accordingly, signals can be calculated by the modules of system 200 and communicated between the modules of system 200 without significant delay, so that a designer and reviewer may share comments between system 200 and reviewer system 112 without perceptible delay to the designer or reviewer.

Moreover, system 200 can be implemented on any suitable device or devices. In one example, system 200 is implemented on one computing device (e.g., computing device 104 in FIG. 1). In another example, system 200 is implemented on more than one computing device. For instance, parts of system 200 can be implemented by a first computing device, such as one computing device of computing device 104 in FIG. 1, and other parts of system 200 can be implemented by an additional computing device of computing device 104. In one example, a server implements parts of system 200, such as server 138 in FIG. 1. A server can be remote, e.g., because it is not collocated with the first computing device. A server may be implemented to receive signals of system 200 from a computing device (e.g., computing device 104), process the received signals, such as with document review support system 142, and transmit results of the processing back to the computing device. Hence, document review support system 142 of server 138 in FIG. 1 can include system 200.

Additionally or alternatively, parts of system 200 can be implemented by an additional computing device that is collocated with a first computing device. For instance, one device of computing device 104 can be a first computing device, and another device of computing device 104 can be an additional, collocated computing device. The first computing device and the additional computing device can be operated by one or more users. Hence, system 200 can provide for multiple users within an environment to share data included in system 200.

In one example, system 200 is implemented as an on-line system that operates in real time, allowing a designer to author a document design and a reviewer to simultaneously review a review document corresponding to the document design via the reviewer system 112. The system 200 and the reviewer system 112 can be coupled to a web-interface through which comments can be shared with no perceptible delay to the designer or reviewer. For instance, a reviewer may provide a reviewer comment via the reviewer system 112 in the review document, which can be imported to the system 200 without perceptible delay to the designer. The designer may provide a reply comment to the review comment via the system 200, and the comment hierarchy including the reviewer comment and the reply comment can be displayed to the reviewer in the review document via the reviewer system 112 without perceptible delay to the reviewer. Hence, the system 200 facilitates real-time document review without requiring the designer to leave the design application used to author the document design.

Comment module 202 can be implemented to add comments reflecting designer input to a document design. Comment module 202 can receive input from a designer and add a comment to the document design based on the designer input. The designer can use comment module 202 to add a reply comment to an existing comment for the document design, such as a reviewer comment made by a reviewer that has been imported by import module 208 into the document design. Additionally or alternatively, the designer can use comment module 202 to add a designer comment, such as an independent comment about the document design that is not in reply to a parent comment. Comment module 202 can add user-entered text of a comment (e.g., a designer comment or a reply comment) in a comment hierarchy for a document design, as well as associating a comment with a portion of the document design. For instance, the comment module 202 can support drawing comments, sticky comments, and text range comments.

Comment module 202 can add a drawing comment when input provided by a designer includes not only text of the comment to be included in the comment hierarchy, but also a drawing on the document design, such as a path drawn with a mouse, drawing tool, stylus, or finger. The drawing can be free-form (e.g., unconstrained), allowing the designer to draw an arbitrary shape, such as a squiggle. Additionally or alternatively, the drawing can also be drawn with a drawing aid, such as a rectangle or circle tool, so that the drawing conforms to a prescribed shape (e.g., a rectangular box or an ellipse).

In one example, the comment module 202 determines an object in a document design based on a drawing of a drawing comment, and associates the drawing comment with the object, such as by assigning an indicator of the object to a data structure for the comment. The indicator for the object can include an object number, an object name, a paragraph number containing the object, a page number containing the object, combinations thereof, and the like. The data structure can include any suitable data for the comment, including an author of the comment, text of the comment, a path of the drawing for a comment, an indicator for an object associated with the comment, a timestamp of the comment, and the like.

Comment module 202 can add a sticky comment when input provided by a designer includes not only text of the comment to be included in the comment hierarchy, but also a designation of a point on the document design, such as a point selected with a mouse click or touch of a stylus on the document design. A sticky comment may therefore be considered as a special case of a drawing comment in which the path of the comment consists of a single point, rather than multiple points making up a curve. Comment module 202 can include the coordinates of a point on the document design for a sticky comment in a data structure representing the sticky comment.

Comment module 202 can add a text comment when input provided by a designer includes not only text of the comment to be included in the comment hierarchy, but also a designation of text in the document design. For example, a designer may select text in a text range of a document design by clicking with a mouse, dragging the mouse to include the text range, and releasing the mouse click. The designer may then add text of the comment to be included in the comment hierarchy that references the selected text range, such as "The data in this paragraph is stale—we'll update it in the next revision when the new data is available".

The comment module 202 can include an indication of a highlight, underline, or strike-through of user-selected text as part of a text comment. For example, a designer can select a text range as described above, and highlight, underline, or strike-though any text of the text range. A designer may underline a first section of text of the text range to emphasize the text or indicate that the text is newly added, and strike-through a second section of text of the text range to indicate that the text has been removed. Hence, the text range of a text comment can include highlighted text, underlined text, text that has been struck-though, or combinations thereof.

The comment module 202 can associate a text comment (e.g., text of the comment to be included in the comment hierarchy) with a text range of the document design in any suitable way. In one example, the comment module 202 maps the text comment to the selected text range and stores an indication of the text range in a data structure representing the text comment. Additionally or alternatively, the comment module 202 can map the text comment to a story identifier that includes the text range, and include the story identifier in the data structure representing the text comment. For instance, a text story can include multiple text frames that are threaded together as part of the text story that spans across pages of the document design.

The comment module 202 provides a comment made by a designer, such as a reply comment that is in reply to a parent comment (e.g., a reviewer comment) or designer comment that is an independent comment that is not in reply to a parent comment, to document design module 204. Data used by or calculated by comment module 202 can be stored in storage 148, accessed as comment data 156 in FIG. 1, and be made available to the modules of system 200.

Document design module 204 can be implemented to author a document design that defines a layout of a document. Document design module 204 receives designer inputs and a design file (e.g., a document object model) and generates a document design from these inputs. For instance, a designer may load an existing document object model into a design application, such as InDesign®, add content to the document design (e.g., text frames and images), and generate a revised document design. Additionally or alternatively, a designer may provide designer inputs to generate a new document design. Content and parameters of the document design can be stored as part of the document object model, and the document design can be loaded into the design application from the document object model for editing.

Document design module 204 also receives comments from comment module 202, such as a designer comment or a reply comment, and reviewer comments from import module 208, and can store these comments as part of the document object model for the document design. From these comments and content of the document object model, document design module 204 generates a comment hierarchy that represents a sequence of comments (e.g., an order of comments based on timestamps of the comments) and links between the comments, such as links indicating dependencies of reply comments on parent comments.

To generate a comment hierarchy, document design module 204 can generate a list of comments for each page of the document design. For example, for each page of the document design, document design module 204 can determine comments that are mapped to a destination on the page, such as the page number, an object on the page (e.g., an image inserted on the page), a text range, a text story, combinations thereof, and the like. In one example, document design module 204 generates a list of comments that are mapped to destinations on each page, and iterates over the list to remove duplicate comments. For instance, since a comment can be mapped to an identifier of a text story and a text story can include multiple threaded text frames, different text frames of a text story can be associated with the same comment. Hence, the document design module 204 may remove duplicate comments from the list of comments that are associated with multiple text frames of a same text story, and use the list of comments to generate the comment hierarchy.

The document design module 204 provides a document design and comment hierarchy for the document design to export module 206. Data used by or calculated by document design module 204 can be stored in storage 148, accessed as document design data 154 and/or comment data 156 in FIG. 1, and be made available to the modules of system 200.

Export module 206 can be implemented to generate a review document that represents the document design and preserves the comment hierarchy. For instance, export module 206 receives a document design and comment hierarchy from document design module 204, and can export data of the document design and comments from the comment hierarchy as a review document. The review document may be of a file format that is viewable with a review application of reviewer system 112, but may not be viewable with a design application of system 200. Examples of file formats for review documents generated by the export module 206 include PDF, GIF, JPEG, and the like.

To export drawing comments that include a free-form drawing, the export module 206 generates a path that is coherent with the internal structure of the file format of the review document. The export module 206 can extract the coordinates of the points of the path corresponding to the free-form drawing, and convert the coordinates from a coordinate system used by the design application and document design to a coordinate system of the review document. For example, the document design can use a coordinate system in which the origin (zero point) is located in a bottom corner of the document design, and the review document can use a coordinate system in which the origin is located in a top corner of the review document. Hence, the export module 206 can convert the coordinates of the path in the document design to coordinates in the review document so that the path is rendered in the same position of the review document and document design. In one example, the export module 206 converts coordinates by applying a transformation matrix to the coordinates. For instance, export module 206 can construct a vector from Cartesian coordinates of a point, and multiply the vector with a transformation matrix to generate new coordinates for the point in a coordinate system for the review document. Since a sticky comment is an example of a drawing comment in which the path of the drawing includes a single point on the document design, the export module 206 can convert the coordinates of the point of the sticky comment to the coordinate system for the review document by applying the transformation matrix to the point of the sticky comment. The export module 206 can provide the coordinates that have been converted with the transformation matrix to an API to generate the review document. In one example, the export module 206 appends the coordinates as a path in a PDF file format with a "curveTo" operation.

To export text comments that reference text of a text range in the document design, the export module 206 can determine coordinates of the corners of bounding boxes of text in the text range, convert the coordinates to a coordinate system for the review document, and provide the converted coordinates to an API call. These operations are illustrated in the algorithm of Table 1 for exporting text comments to a PDF file, and are described below concurrently with reference to FIG. 3 that illustrates an example document design 300 in accordance with one or more aspects of the disclosure. The document design 300 includes a first page 302 and a second page 304, which are examples of adjacent pages of the document design.

TABLE 1

Algorithm for Exporting Text Comments to PDF

Step 1: Create an empty CosArray QP
for all Text lines in selected text do
    Step 2: Divide the line into sets of characters with the same height
    for all Sets of continuous characters with the same height do
        Step 3: Find the bounding box B of the set of characters
        Step 4: Convert B from InDesign to PDF Coordinates
        if B lies within the bounds of PDF Page currently being exported then
            Step 5: Append the coordinates of four corners of B to QP
        end if
    end for
end for
if QP is not empty then
    Step 6: Create a Text Annotation in PDF with PDPageCreateAnnot API
    which returns PDAnnot object A
    Step 7: Get the CosObj C of A and add a dictionary entry 'Quad-Points':QP to C
    Step 8: Save the Annotation A with PDPageAddAnnot API call
end if At step 1 of the algorithm of Table 1, an empty array denoted by QP is generated. Steps 2-5 are performed for each line of text in the text range corresponding to the text comment. For example, in FIG. 3, the text range 306 includes text of the document design 300 associated with a text comment (e.g., user-selected text), and includes seven lines of text numbered 1-7. For each of the lines of text 1-7, steps 2-5 of the algorithm of Table 1 can be executed.

At step 2 of the algorithm of Table 1, each of the lines of text is divided into sets of continuous characters having a same font height, and at step 3, bounding boxes are determined for each of the sets of continuous characters. For example, line 1 of the text range 306 in FIG. 3 includes characters that are all of a same font height, which includes upper case and lower case characters. Consequently, the export module 206 determines a single bounding box for the characters of line 1. Line 2 of the text range 306 in FIG. 3, however, includes the equation $A=\pi r^2$. Hence, the export module 206 determines three bounding boxes for the characters of line 2—one for the equation, another for the set of continuous characters on the left side of the equation, and another for the set of continuous characters on the right side of the equation. Line 3 of the text range 306, like line 1, includes characters that are all of a same font height, so that the export module 206 determines a single bounding box for the characters of line 3. The export module 206 determines three bounding boxes for the text of line 4 since this line includes the text "Bgs Mjsqu et Nbasfb" in a larger font than the other text of line 4.

The export module 206 can determine bounding boxes for text of a text range by determining a minimum number of bounding boxes for sets of continuous characters. Hence, if two or more lines of text have characters of a same height and the text lines are of a same width, then the export module 206 can determine a single bounding box for the text of the two or more lines. For example, lines 5 and 6 of the text range 306 include characters that are all of a same font height. Furthermore, lines 5 and 6 are of a same width. Accordingly, the export module 206 determines a single bounding box for lines 5 and 6.

Each bounding box can be represented by the coordinates of the corners of the bounding box. Hence, each bounding box can be represented by eight integers (e.g., Cartesian coordinates of the four corners of the bounding box). At step 4 of the algorithm of Table 1, the coordinates of corners of the bounding boxes are converted from a coordinate system of the design application (e.g., InDesign®) to a coordinate system usable by the PDF review document. For instance, the export module 206 can apply a transformation matrix to the coordinates of corners of the bounding boxes to convert the coordinates to a coordinate system usable by the PDF review document.

At step 5 of the algorithm of Table 1, the converted coordinates of the corners of the bounding boxes for a current page of the PDF review document being exported are appended to the array QP created at step 1. If the bounding box does not lie on the current page being exported, however, the coordinates are discarded and not appended to the QP array. This prevents duplication of comments on another page of the PDF review document. At steps 6-8 of the algorithm of Table 1, the export module 206 uses the contents of the QP array to populate fields of an API entitled PDPageAddAnnot. The API can be executed to generate the PDF review document that includes the text comment and accurately includes the text range 306 designated in the document design.

Returning to FIG. 2, the export module 206 can also export reply comments. A reply comment is linked to another comment for which the comment is in reply to (i.e., a parent comment), and the reply comment can be a drawing comment, a sticky comment, or a text comment, as previously described. To export reply comments, the export module 206 can determine each comment in the comment hierarchy that is a reply comment. For instance, the association of a reply comment to a parent comment can be stored as part of the document object model and represented in the comment hierarchy. The export module 206 can determine reply comments from the comment hierarchy, and populate a reply field (e.g., an "in reply to" field) of the review document that links the reply comment to an associated parent comment as a reply.

The export module 206 provides the review document to the reviewer system 112. The review document preserves the comment hierarchy and accurately represents annotations, such as drawings, highlights, underlines, and strike-throughs, so that they are rendered in the review document with reference to the same content as in the document design. Data used by or calculated by export module 206 can be stored in storage 148, accessed as export data 158 in FIG. 1, and be made available to the modules of system 200.

A reviewer can operate reviewer system 112 and add reviewer comments in the review document. The reviewer system 112 can then provide the review document with the reviewer comments to import module 208 of system 200. Import module 208 can be implemented to import reviewer comments from the review document received from the reviewer system 112. The reviewer comment can be any suitable type of comment, such as a reply comment, a drawing comment, a text comment, or a sticky comment, as previously described. For each reviewer comment added to the review document, the import module 208 can map the reviewer comment to a destination of the document design. A destination can include an indicator of a page (e.g., a page number), an object displayable in the document design (e.g., an object name or identification number), a story (e.g., a story identification number), text of the document design, combinations thereof, and the like.

The import module 208 can provide the reviewer comment, including text entered by the reviewer and an annotation on the review document, such as a text range, a highlight, strike-through, underline, path, drawing, etc., along with the destination for the reviewer comment to document design module 204, which can then update the document object model and comment hierarchy to include the reviewer comment. Data used by or calculated by import module 208 can be stored in storage 148, accessed as import data 160 in FIG. 1, and be made available to the modules of system 200.

The systems described herein constitute an improvement over conventional document review systems that implement unidirectional commenting in which a designer is required to leave a design application used to author a document design to communicate with comments to a reviewer of the document design. Instead, the systems described herein facilitate bidirectional comments that can be shared between the design application and a reviewer application used to view a review document corresponding to the document design. Hence, the designer can remain working in the design application and communicate via comments within the context of the document design, thus eliminating the interrupted workflow inherent to conventional document review systems. Moreover, unlike conventional document review systems, the comment hierarchy that represents the sequence of comments and links between the comments is preserved by the systems described herein when comments are shared between the designer and reviewer. Furthermore, the systems described herein can remove duplicate comments, and ensure comments appear on the correct page of a review document, unlike conventional document review systems. In one example, the systems described herein are implemented as a real-time review system in which the designer remains working in the design application and the reviewer operates a reviewer application, while facilitating sharing of comments between the designer and reviewer without perceptible delay, which is simply not possible with conventional document review systems. Accordingly, the systems described herein are more efficient than conventional document review systems, and may therefore allow designers and reviewers to generate higher-quality document designs than those generated with conventional document review systems.

Example User Interfaces

Figure 8:
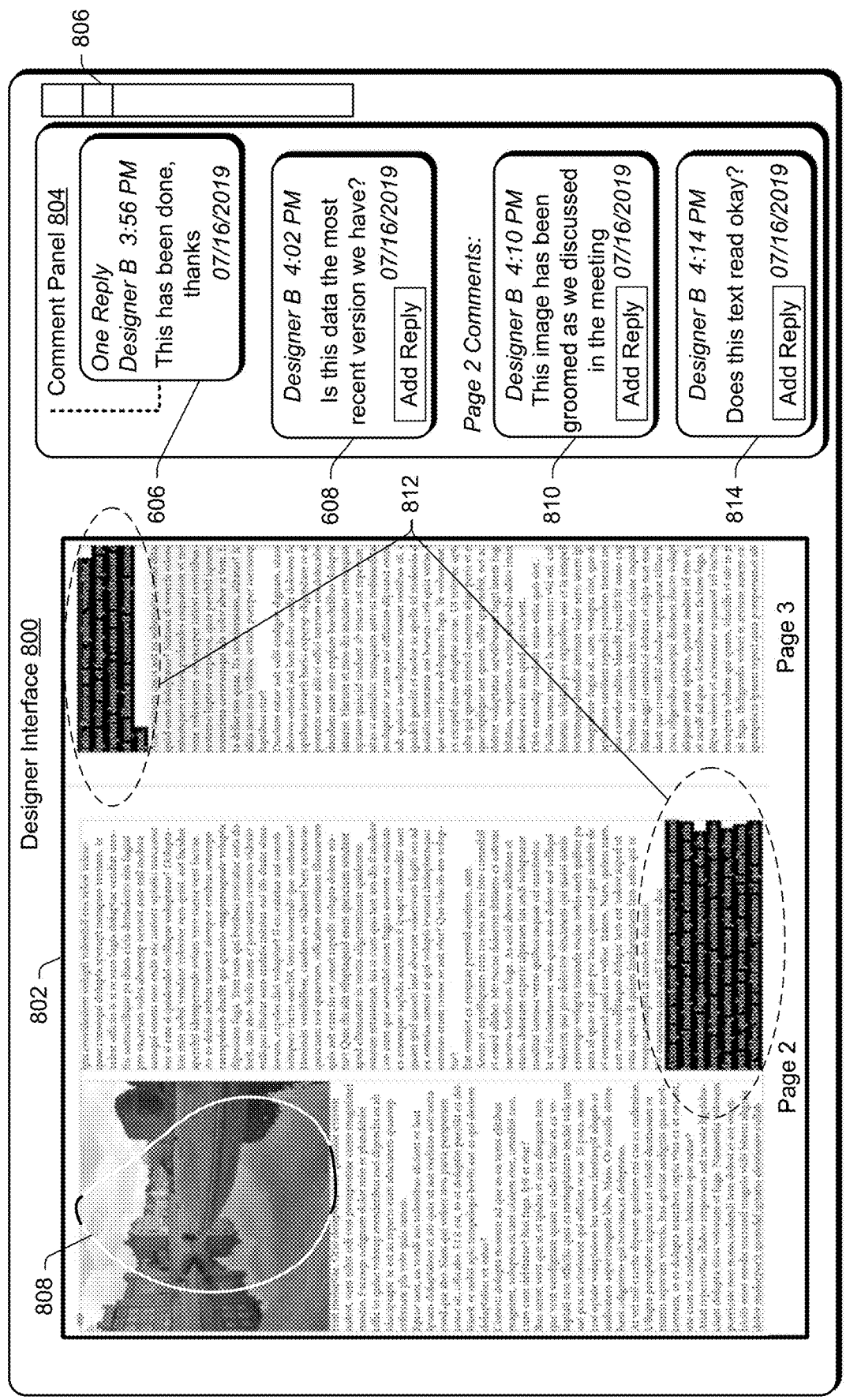

FIGS. 4-8 illustrate example user interfaces in accordance with one or more aspects of the disclosure. These examples user interfaces can be displayed to designers and reviewers for reviewing document designs as part of an on-line review (e.g., in which a designer and reviewer participate via a web interface in the on-line review simultaneously) or an off-line review (e.g., a designer and reviewer may participate in the review at different times from one another). The example user interfaces can be presented in succession to facilitate reviewing document designs. For instance, the user interface of FIG. 4 can be presented to a designer, followed by the user interface of FIG. 5 being presented to a reviewer, followed by the user interface of FIG. 6 being presented to the designer, followed by the user interface of FIG. 7 being presented to the reviewer. The user interface of FIG. 8 illustrates subsequent pages of the document design illustrated in FIG. 6.

Figure 4:
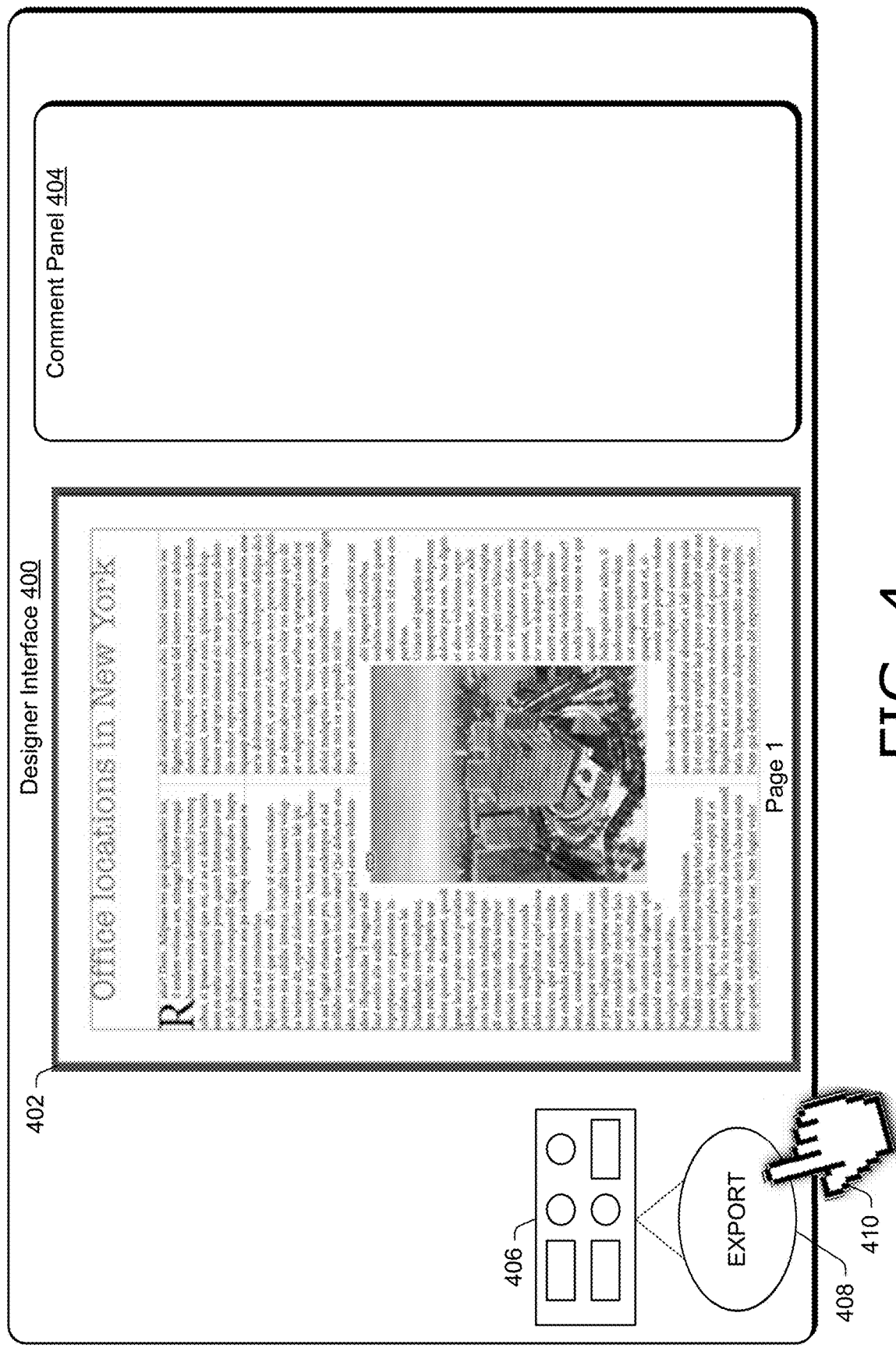

FIG. 4 illustrates an example designer interface 400 in accordance with one or more aspects of the disclosure. Designer interface 400 is an example of a user interface that can be displayed by a document review system to a designer, such as on computing device 104 to designer 102 in FIG. 1. Designer interface 400 includes a document design 402 and a comment panel 404 for displaying a comment hierarchy that includes comments regarding the document design 402. In FIG. 4, the comment panel 404 is empty to illustrate that no comments have yet been made regarding the document design 402. For instance, the document design 402 may be newly authored by a designer and not yet reviewed by a reviewer. The designer can adjust the size of and move the document design 402 and the comment panel 404 in any suitable way. For instance, the designer may select the comment panel 404 with a selection gesture (e.g., mouse click and hold), drag it with a drag gesture (e.g., mouse movement), and de-select it with a de-selection gesture (e.g., release the mouse button) to move the comment panel 404. The designer can move the comment panel 404 to overlap the document design. In one example, the comment panel 404 is displayable within the document design 402, such as a sidebar as part of the document design 402 responsive to the designer moving the comment panel 404 on top of the document design 402.

The designer interface 400 also includes control panel 406, which can include any suitable control or option regarding the designer interface 400. The control panel 406 is generally shown as a collection of rectangles and circles representing sliders, buttons, tabs, switches, knobs, and the like which a user may select, adjust and otherwise use to edit document design 402 and control designer interface 400. Examples of control options in control panel 406 include adjusters for brightness, contrast, color, selection of filters, crop, overlay, import, export, font type, size and color, zoom, text frame creation, object insertion, comment addition, saving the document design 402, selection of a drawing tool, and the like. In the example in FIG. 4, the designer has selected an export option 408 to export the document design 402 as a review document (e.g., a PDF document), which is illustrated by the selection 410. Responsive to the selection 410, the document review system generates the review document from the document design 402 and communicates it to a reviewer, such as part of an on-line review.

Figure 5:
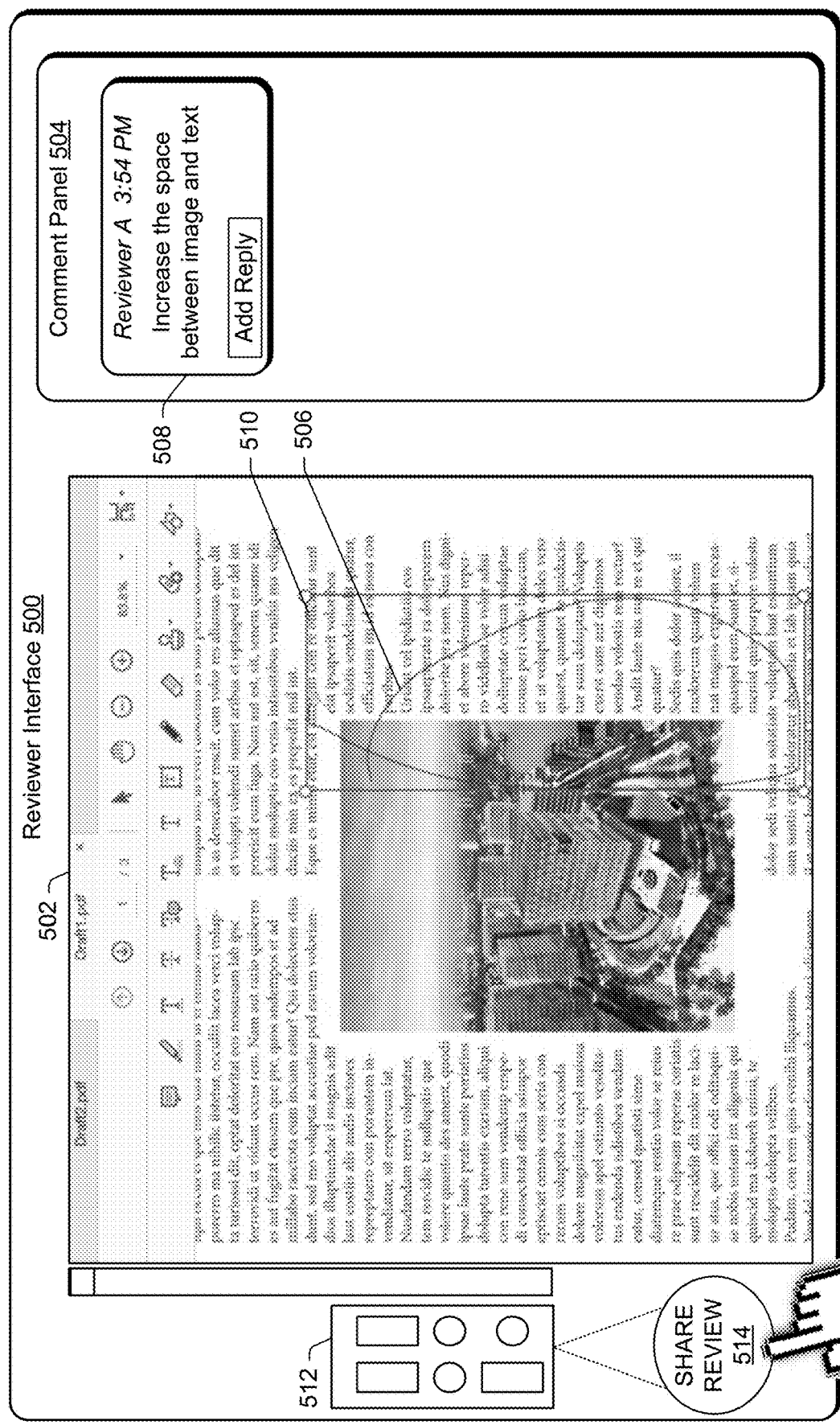

FIG. 5 illustrates an example reviewer interface 500 in accordance with one or more aspects of the disclosure.

Reviewer interface 500 is an example of a user interface that can be displayed by a document review system to a reviewer, such as on computing device 108 to reviewer 106 in FIG. 1. In the example in FIG. 5, the reviewer interface 500 displays a review document 502 that corresponds to the document design 402 of FIG. 4. For instance, the review document 502 can be a PDF document communicated to the reviewer interface 500.

The reviewer interface 500 includes a comment panel 504 for displaying a comment hierarchy. In the example in FIG. 5, the reviewer has added a drawing comment to the review document 502, which includes the annotation 506 on the review document 502 and the text of comment 508 in the comment panel 504. For example, the annotation 506 illustrates a path drawn by the reviewer (e.g., an ellipse) and the comment 508 includes the text "Increase the space between image and text". The comment 508 in the comment panel 504 is an example of a reviewer comment and illustrates that the comment 508 was entered by person named "Reviewer A" at a time of 3:54 PM. When comment 508 is selected (e.g., by clicking on it with a mouse), the reviewer interface 500 can emphasize the annotation 506, such as by displaying the bounding box 510 around the annotation 506. The bounding box 510 denotes that the drawing annotation 506 on the review document is associated with the comment 508 in the comment panel 504. The reviewer can adjust the size of and move the review document 502 and the comment panel 504 in any suitable way. In one example, the comment panel 504 is displayable within the review document 502, such as a sidebar as part of the review document 502.

The reviewer interface 500 also includes control panel 512, which can include any suitable control or option regarding the reviewer interface 500. The control panel 512 is generally shown as a collection of rectangles and circles representing sliders, buttons, tabs, switches, knobs, and the like which a user may select, adjust and otherwise use to review the review document 502 and control reviewer interface 500. Examples of control options in control panel 512 include adjusters for brightness, contrast, color, selection of filters, crop, overlay, import, export, font type, size and color, zoom, comment addition, saving the review document 502, selection of a drawing tool, and the like. In the example in FIG. 5, the reviewer has selected a share review option 514 to share the review document 502 and comments of the comment panel 504, which is illustrated by the selection 516. Responsive to the selection 516, the document review system can communicate the review document 502 along with a comment hierarchy that includes the comment 508 and drawing annotation 506 to the designer who authored the document design 402 corresponding to the review document 502.

Figure 6:
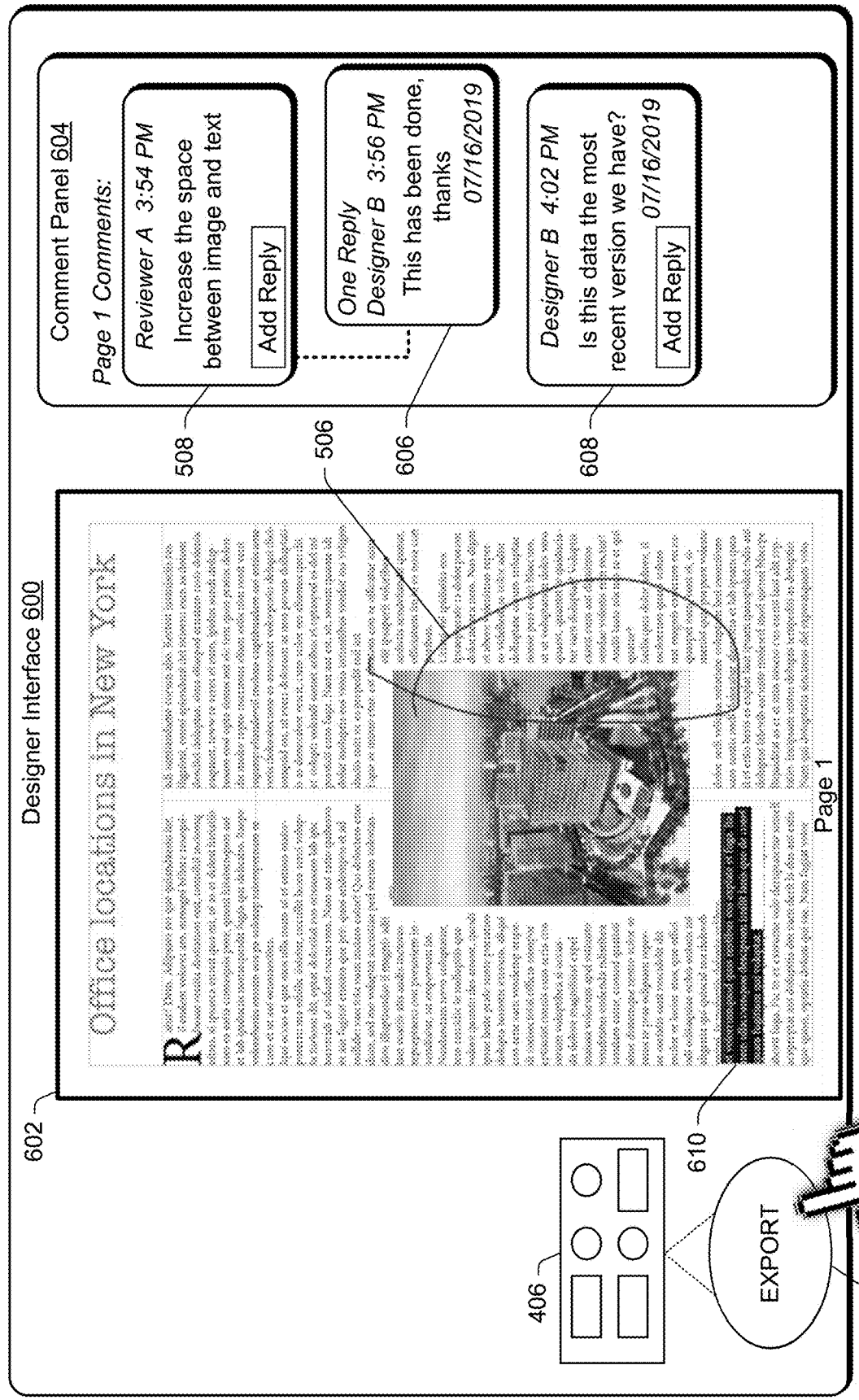

Hence, FIG. 6 illustrates an example designer interface 600 including comments extracted from the review document 502 of FIG. 5. For example, designer interface 600 is an example of a designer interface displayed at a later time of the document review session than the designer interface 400, such as responsive to the document review system receiving the review document 502 of FIG. 5. Designer interface 600 displays the document design 602 and the comment panel 604. Since the document review system imports the reviewer comments from FIG. 5, the document design 602 includes the drawing annotation 506, and the comment panel 604 includes the comment 508 made by Reviewer A, as previously described. The comment panel 604 displays a comment hierarchy for the document design 602, including comments made by the designer and the reviewer in a sequence, and links between the comments denoting dependencies of the comments. For example, the comment hierarchy includes one reply comment made to the reviewer comment 508, and therefore the comment panel 604 displays the reply comment 606 with a dashed line linking it to the comment 508. In the reply comment 606, a designer denoted by Designer B has added at 3:56 PM on Jul. 16, 2019 the text "This has been done, thanks" to indicate that the space between the image and the text at drawing annotation 506 of the document design 602 has been increased, per Reviewer A's request.

The comment hierarchy of the document design 602 also includes a text comment added by the Designer B, and hence the comment panel 604 displays comment 608. The comment 608 is an example of a designer comment that is an independent comment that is not made in reply to a parent comment. The comment 608 was made by the Designer B at 4:02 PM on Jul. 16, 2019, and is therefore displayed below the comment 508 in the comment panel 604 to represent the order of the independent comments. The comment 608 includes the text "Is this data the most recent version we have?", querying the reviewer. The text of the comment 608 is in reference to the text 610 of the document design 602 that has been highlighted by the designer.

To share the document design 602 that has been revised for the designer, the designer again selects the export option 408, illustrated by the selection 612. Responsive to the selection 612, the document review system generates a revised review document from the document design 602 and communicates it to the reviewer for subsequent review. Hence, FIG. 7 illustrates an example reviewer interface 700 displayable to the reviewer based on the document design 602 of FIG. 6. The reviewer interface 700 includes the review document 702, which is an example of a review document generated by the document review system from the document design 602 of FIG. 6. Accordingly, the review document 702 includes the drawing annotation 506 and the highlighted text 610, which are rendered in the review document 702 accurately with respect to the document design 602 of FIG. 6. For example, the drawing annotation 506 in the review document 702 is rendered in a same position as the document design 602 relative to the content of the review document 702 and the document design 602. Moreover, the highlighted text 610 corresponds to the same text in the document design 602 and the review document 702.

The reviewer interface 700 also includes a comment panel 704. When the document review system exports the comments of the document design 602, the comment hierarchy is preserved. Hence, the comment panel 704 displays the reviewer comment 508, the reply comment 606 that is in reply to the comment 508, and the designer comment 608 in a correct order and with the dashed line linking the reply comment 606 with the reviewer comment 508. Moreover, the comment panel 704 does not display duplicate comments, and displays the comments referenced to page 1 of the review document 702 that is currently displayed by the review document 702.

FIG. 8 illustrates an example designer interface 800 in accordance with one or more aspects of the disclosure. Designer interface 800 is a continuation of the designer interface 600 of FIG. 6. For instance, in FIG. 6, the document design 602 displays page 1 of a document design, and the document design 802 of FIG. 8 displays page 2 and part of page 3 of the document design. The designer interface 800 also includes comment panel 804 and slider 806 usable to scroll through the comments of the comment panel 804. In the example in FIG. 8, the designer has scrolled down the comment panel 804 with slider 806, so that the comment panel 804 displays the reply comment 606 and the designer comment 608 as previously described, but the reviewer comment 508 has been moved out of view due to the position of the slider 806.

On page 2 of the document design 802, the designer has added the drawing annotation 808 over the image depicted in the document design 802, and added the text of comment 810 in the comment panel 804. Comment 810 includes the text "This image has been groomed as we discussed in the meeting", and was made my Designer B at 4:10 PM on Jul. 16, 2019. Subsequent to adding this drawing comment, the designer has also added a text comment. For example, the designer has highlighted the text 812 that spans page 2 and page 3 of the document design 802, and added the corresponding text of comment 814 in the comment panel 804. The comment 814 includes the text "Does this text read okay?" in reference to the highlighted text 812 in the document design 802. To preserve the sequence of the comment hierarchy based on the timestamps of the independent comments, the comment panel 804 displays the comment 814 underneath the comment 810.

The comment panel also displays the comment 810 and the comment 814 under the heading of "Page 2 comments". The text 812 referenced by the comment 814 is an example of threaded text frames of the document design 802 in which a text story includes text frames that span across pages of the document design 802. Rather than placing the comment 814 under a heading for page 3 of the document design, the document review system determines that the comment 814 is in reference to the text 812 that begins on page 2 of the document design, and therefore places the comment 814 under the page 2 heading. When the document review system exports the document design 802 and the comment hierarchy represented in the comment panel 804 to generate a review document, the document review system can use the algorithm of Table 1 as discussed above to correctly associate the comment 814 with page 2 of the review document and prevent a duplicate comment of the comment 814 from appearing with reference to page 3 of the review document. Thus, the document review system can be used for threaded text frames of a text story and correctly resolves the placement of comments for the threaded text frames without introducing duplicate comments, which can confuse a user.

Example Procedures

Figure 9:
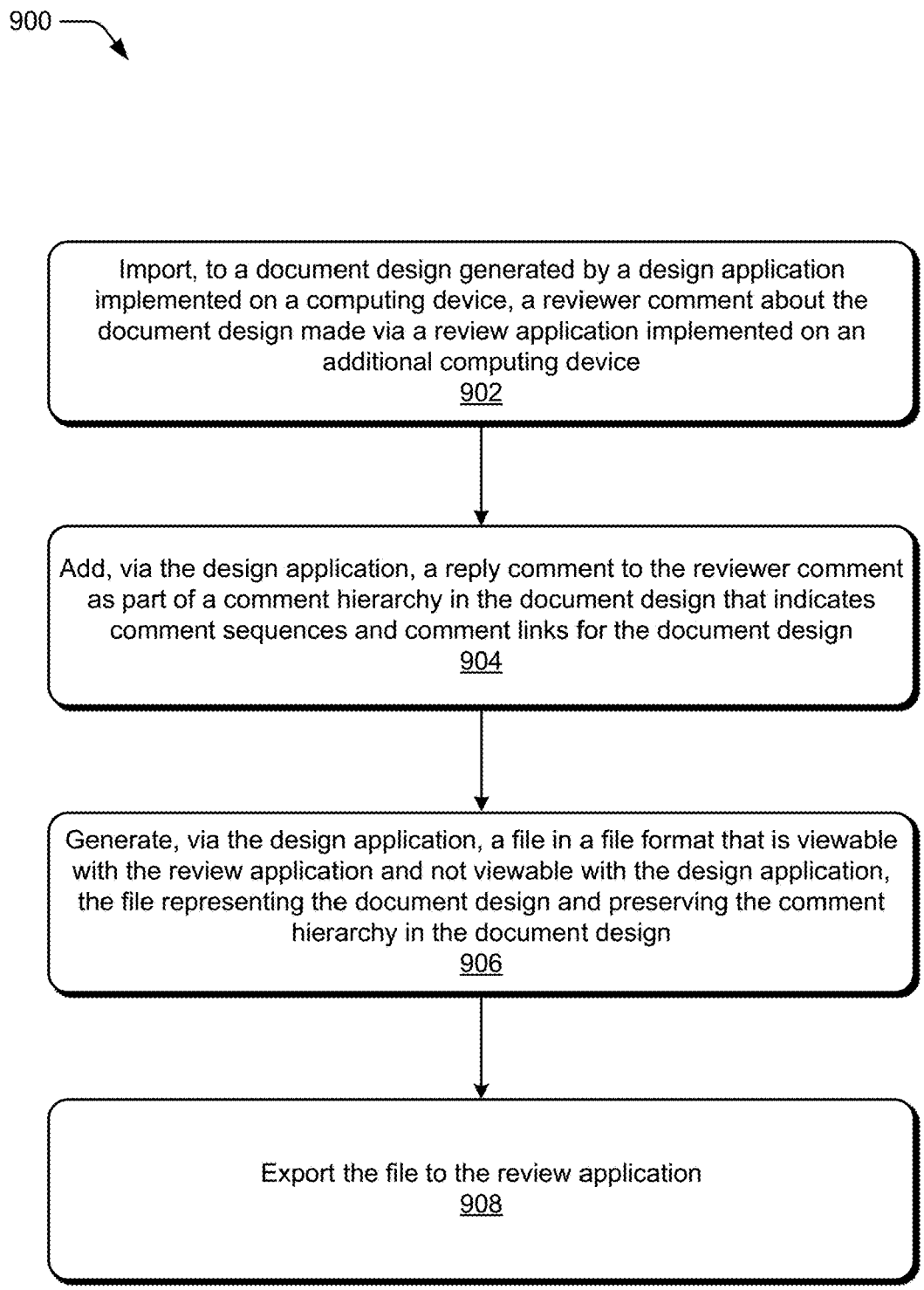
FIG. 9 illustrates a flow diagram depicting an example procedure in accordance with one or more aspects of the disclosure.

FIG. 9 illustrates an example procedure 900 for reviewing document designs in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 138 of FIG. 1 that makes use of a document review system, such as system 200 or document review system 110. A document review system implementing procedure 900 may be an independent application that has been installed on the computing device, a service hosted by a service provider that is accessible by the computing device, a plug-in module to the computing device, or combinations thereof.

A reviewer comment about a document design made via a review application implemented on an additional computing device is imported to a document design generated by a design application implemented on a computing device (block 902). For instance, import module 208 can import, to a document design generated by a design application implemented on the computing device, a reviewer comment about the document design made via a review application implemented on an additional computing device. Design application 152 and review application 162 in FIG. 1 are examples of the design application and the review application, respectively.

In one example, importing the reviewer comment includes associating the reviewer comment with a destination of the document design in the design application. The destination can be denoted by an indicator of at least one of a page, an object displayable in the document design, or text of the document design. The reviewer comment and the destination can be stored as part of a document object model of the document design.

A reply comment to the reviewer comment is added via the design application as part of a comment hierarchy in the document design that indicates comment sequences and comment links for the document design (block 904). For instance, comment module 202 can add, via the design application, a reply comment to the reviewer comment as part of a comment hierarchy in the document design that indicates comment sequences and comment links for the document design. The comment hierarchy can be displayed with a link annotation (e.g., a line) between the reply comment and the reviewer comment.

A file in a file format that is viewable with the review application and not viewable with the design application is generated via the design application (block 906). The file can represent the document design and preserve the comment hierarchy in the document design. For instance, export module 206 can generate, via the design application, a file in a file format that is viewable with the review application and not viewable with the design application, the file representing the document design and preserving the comment hierarchy in the document design. For example, the file format can be PDF.

The file is exported to the review application (block 908). For instance, export module 206 can export the file to the review application. In one example, exporting the file includes populating a reply field of the file that links the reply comment to the reviewer comment as a reply. Importing and exporting can include communicating the comments of the comment hierarchy between the design application and the review application via a web interface to implement an online review.

A designer comment can be added via the design application as part of the comment hierarchy in the document design. The designer comment can include an indication of a text range of the document design, and at least one of a strike-through, an underline, or a highlight of text in the text range. In one example, the designer comment includes a free-form drawing. Exporting the file can include extracting one or more path points of the free-form drawing from the design application, and converting the path points from a coordinate system used by the design application to a coordinate system usable by the review application (e.g., a coordinate system of the file).

Additionally or alternatively, the designer comment can include an indication of a text range of the document design. Exporting the file can include, for each line of text in the text range, determining sets of continuous characters having a same font height, determining bounding boxes for the sets of continuous characters, and converting coordinates of corners of the bounding boxes from a coordinate system used by the design application to a coordinate system usable by the review application. Exporting the file can also include providing the coordinates of the corners of the bounding boxes resulting from the converting to an API, and executing the API to generate the file representing the document.

In one example, exporting the file includes determining a current page of the file. Based on the coordinates of the corners of the bounding boxes resulting from converting the coordinates, one or more of the bounding boxes not on the current page are determined, and the coordinates of the corners for the one or more bounding boxes can be discarded to prevent comment duplication.

Figure 10:
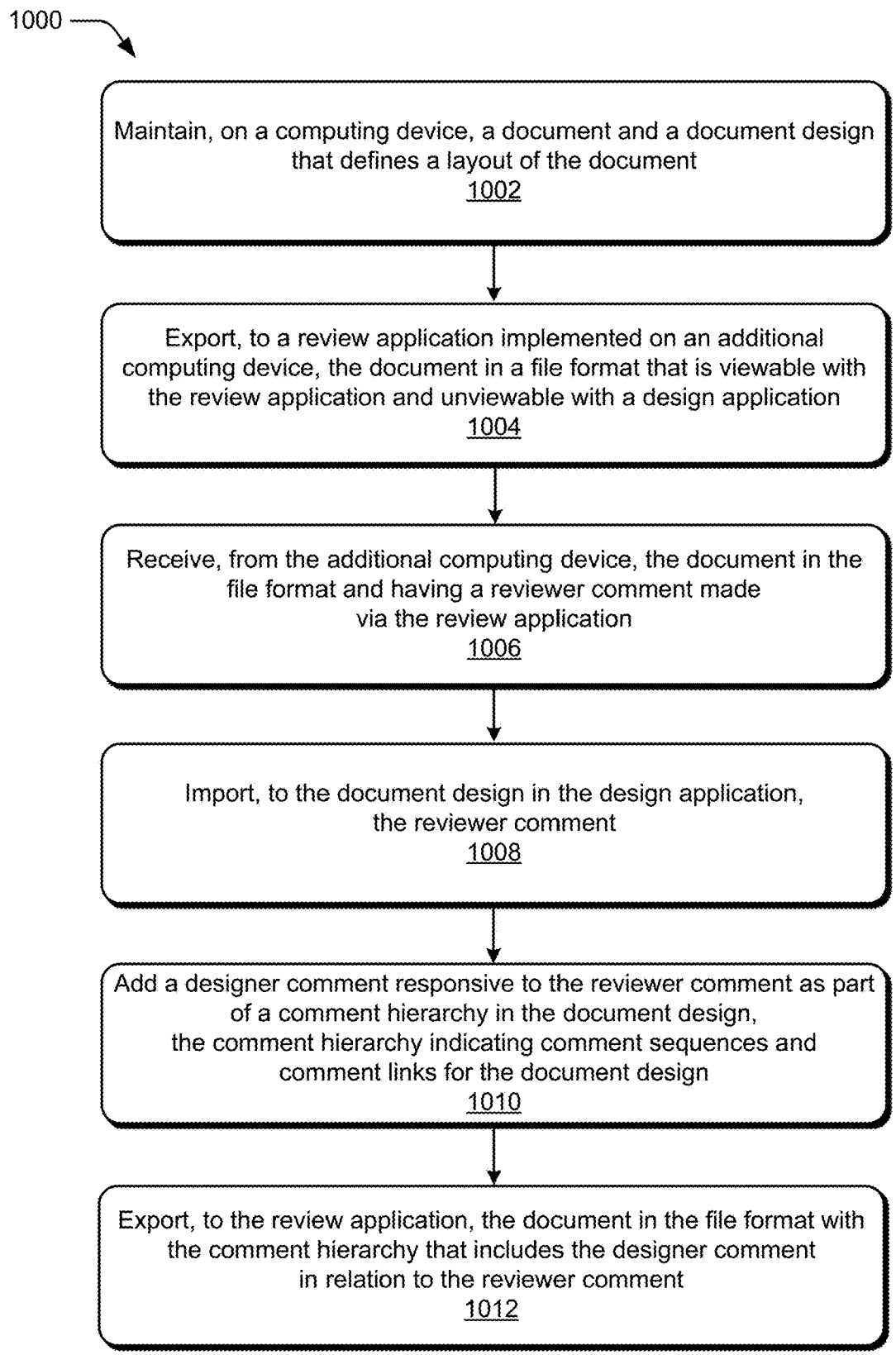
FIG. 10 illustrates a flow diagram depicting an example procedure in accordance with one or more aspects of the disclosure.

FIG. 10 illustrates an example procedure 1000 for reviewing document designs in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 138 of FIG. 1 that makes use of a document review system, such as system 200 or document review system 110. A document review system implementing procedure 1000 may be an independent application that has been installed on the computing device, a service hosted by a service provider that is accessible by the computing device, a plug-in module to the computing device, or combinations thereof.

A document and a document design that defines a layout of the document are maintained (block 1002). For instance, document design module 204 can maintain a document and a document design that defines a layout of the document. The document design can be stored as part of a document object model that can be loaded into a design application to expose the document design, and the document can be generated by the design application from the document design. Review document 116 in FIG. 1 is an example of the document.

The document in a file format that is viewable with the review application and unviewable with the design application is exported to a review application implemented on an additional computing device (block 1004). For instance, export module 206 can export, to a review application implemented on an additional computing device, the document in a file format that is viewable with the review application and unviewable with the design application. The file format can be a PDF format.

The document in the file format and having a reviewer comment made via the review application is received from the additional computing device (block 1006). For instance, import module 208 can receive, from the additional computing device, the document in the file format and having a reviewer comment made via the review application.

The reviewer comment is imported to the document design in the design application (block 1008). For instance, import module 208 can import, to the document design in the design application, the reviewer comment. A designer comment is added responsive to the reviewer comment as part of a comment hierarchy in the document design, the comment hierarchy indicating comment sequences and comment links for the document design (block 1010). For instance, comment module 202 can add a designer comment responsive to the reviewer comment as part of a comment hierarchy in the document design, the comment hierarchy indicating comment sequences and comment links for the document design.

The document in the file format with the comment hierarchy that includes the designer comment in relation to the reviewer comment is exported to the review application (block 1012). For instance, export module 206 can export, to the review application, the document in the file format with the comment hierarchy that includes the designer comment in relation to the reviewer comment.

In one example, the designer comment includes a free-form drawing. Exporting of the document in the file format can include extracting one or more path points of the free-form drawing from the design application, and converting the path points from a coordinate system used by the design application to a coordinate system of the document in the file format and usable by the review application.

Additionally or alternatively, the designer comment can include an indication of a text range of the document design. Exporting of the document in the file format can include, for each line of text in the text range, determining sets of continuous characters having a same font height, determining bounding boxes for the sets of continuous characters, and converting coordinates of corners of the bounding boxes from a coordinate system used by the design application to a coordinate system of the document in the file format and usable by the review application.

In one example, the design application adds a reply comment to the reviewer comment as part of the comment hierarchy in the document design, and populates a reply field of the document in the file format that links the reply comment to the reviewer comment as a reply. The design application can export, to the review application, the document in the file format with the comment hierarchy that includes the reply comment in relation to the reviewer comment.

FIG. 11 illustrates an example procedure 1100 for reviewing document designs in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 138 of FIG. 1 that makes use of a document review system, such as system 200 or document review system 110. A document review system implementing procedure 1100 may be an independent application that has been installed on the computing device, a service hosted by a service provider that is accessible by the computing device, a plug-in module to the computing device, or combinations thereof.

A document in a file format that is viewable with a review application and unviewable with a design application used to generate a document design that defines a layout of the document is exported to the review application (block 1102). The review application is implemented on an additional computing device than a computing device that implements the design application. For instance, export module 206 can export, to a review application a document in a file format that is viewable with the review application and unviewable with a design application used to generate a document design that defines a layout of the document. The design application can be implemented on a computing device, and the review application can be implemented on an additional computing device.

A reviewer comment made via the review application to the document in the file format is imported to the document design in the design application (block 1104). For instance, import module 208 can import, to the document design in the design application, a reviewer comment made via the review application to the document in the file format.

A designer comment or a reply comment is added as part of a comment hierarchy in the document design, the comment hierarchy indicating comment sequences and comment links for the document design (block 1106). For instance, comment module 202 and document design module 204 can work in conjunction to add a designer comment or a reply comment as part of a comment hierarchy in the document design, the comment hierarchy indicating comment sequences and comment links for the document design.

The document in the file format with the comment hierarchy that includes the designer comment or the reply comment in relation to the reviewer comment is exported to the review application (block 1108). For instance, export module 206 can export, to the review application, the document in the file format with the comment hierarchy that includes the designer comment or the reply comment in relation to the reviewer comment.

In one example, exporting the document in the file format with the comment hierarchy that includes the designer comment or the reply comment in relation to the reviewer comment includes generating the document in the file format with an indication of at least one of a text range, a free-form drawing path, or an object in the document, the indication being part of at least one of the reviewer comment, the designer comment, or the reply comment. The export module 206 can convert coordinates of the indication from a coordinate system used by the design application to a coordinate system of the file format.

The procedures described herein constitute an improvement over conventional document review procedures that implement unidirectional commenting in which a designer is required to leave a design application used to author a document design to communicate with comments to a reviewer of the document design. Instead, the procedures described herein facilitate bidirectional comments that can be shared between the design application and a reviewer application used to view a review document corresponding to the document design. Hence, the designer can remain working in the design application and communicate via comments within the context of the document design, thus eliminating the interrupted workflow inherent to conventional document review procedures. Moreover, unlike conventional document review procedures, the comment hierarchy that represents the sequence of comments and links between the comments is preserved by the procedures described herein when comments are shared between the designer and reviewer. Furthermore, the procedures described herein can remove duplicate comments, and ensure comments appear on the correct page of a review document, unlike conventional document review procedures. In one example, the procedures described herein are implemented as a real-time review system in which the designer remains working in the design application and the reviewer operates a reviewer application, while facilitating sharing of comments between the designer and reviewer without perceptible delay, which is simply not possible with conventional document review procedures and systems. Accordingly, the procedures described herein are more efficient than conventional document review procedures, and may therefore allow designers and reviewers to generate higher-quality document designs than those generated with conventional document review procedures.

Example Systems and Devices

Figure 12:
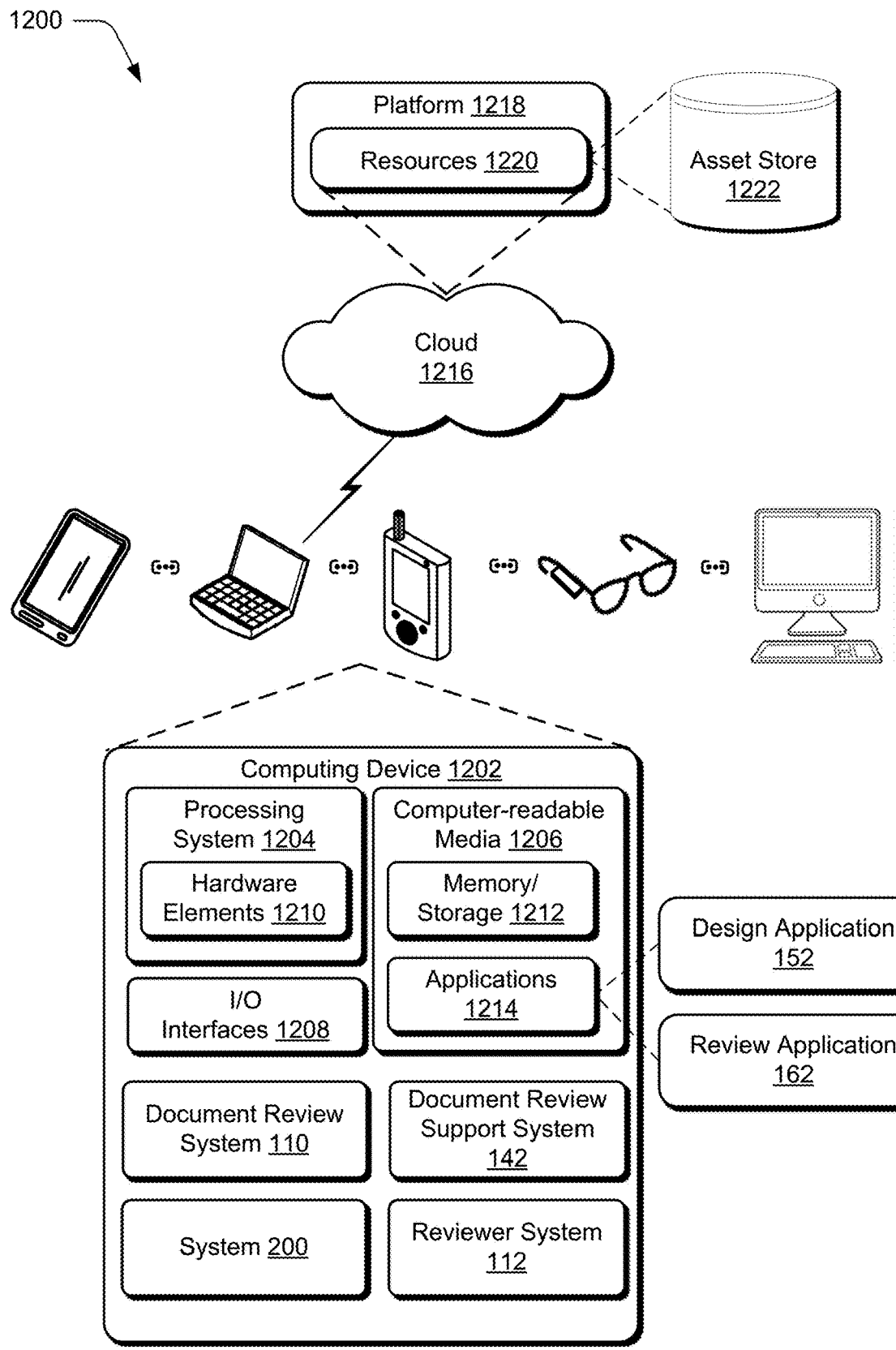
FIG. 12 illustrates an example system including various components of an example device that can be implemented as any type of computing device as described and/or utilized with reference to FIGS. 1-11 to implement aspects of the techniques described herein.

FIG. 12 illustrates an example system 1200 including an example computing device 1202 that is representative of one or more computing systems and devices that can be utilized to implement the various techniques described herein. This is illustrated through inclusion of document review system 110, system 200, design application 152, review application 162, reviewer system 112, and document review support system 142, which operate as described above. Computing device 1202 can be, for example, a user computing device (e.g., computing device 104), or a server device of a service provider, (e.g., server 138). Furthermore, computing device 1202 can include an on-chip system, multiple computing devices, combinations thereof, or any other suitable computing device or computing system. Accordingly, FIG. 12 illustrates computing device 1202 as one or more of a tablet, a laptop computer, a smart phone, smart eye glasses, and a desktop computer, though these examples are illustrative and in no way are meant to limit the type or number of devices that can be represented by computing device 1202.

The example computing device 1202 includes a processing system 1204, one or more computer-readable media 1206, and one or more I/O interfaces 1208 that are communicatively coupled to each other. Although not shown, computing device 1202 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1204 is representative of functionality to perform one or more operations using hardware. Accordingly, processing system 1204 is illustrated as including hardware elements 1210 that can be configured as processors, functional blocks, and so forth. This may include implementation in hardware as an application specific integrated circuit or other logic device formed using one or more semiconductors. Hardware elements 1210 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. Processors 146 in FIG. 1 are an example of processing system 1204.

Computer-readable storage media 1206 is illustrated as including memory/storage 1212. Storage 148 in FIG. 1 is an example of memory/storage of memory/storage 1212. Memory/storage 1212 can include volatile media (such as random access memory (RAM)), nonvolatile media (such as read only memory (ROM), flash memory, optical disks, magnetic disks, and so forth), or combinations thereof. Memory/storage 1212 can include fixed media (e.g., RAM, ROM, a fixed hard drive, and so on) as well as removable media (e.g., flash memory, a removable hard drive, an optical disc, and so forth). Computer-readable media 1206 can be configured in a variety of other ways as further described below.

Input/output interfaces 1208 are representative of functionality to allow a user to enter commands and information to computing device 1202, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, input/output interfaces 1208 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, computing device 1202 can be configured in a variety of ways as further described below to support user interaction.

Computing device 1202 also includes applications 1214. Applications 1214 are representative of any suitable applications capable of running on computing device 1202, and can include a web browser which is operable to access various kinds of web-based resources (e.g., images, videos, assets, media clips, images, content, configuration files, services, user profiles, and the like). Applications 1214 include design application 152 and review application 1652, which operate as previously described. Furthermore, applications 1214 may include any applications supporting document review system 110, system 200, reviewer system 112, and document review support system 142.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1202. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1210, or combinations thereof. Computing device 1202 may be configured to implement particular instructions and functions corresponding to the software and hardware modules. Accordingly, implementation of a module that is executable by computing device 1202 as software may be achieved at least partially in hardware, e.g., through use of computer-readable storage media and hardware elements 1210 of processing system 1204. The instructions and functions may be executable/operable by one or more articles of manufacture (for example, one or more computing devices such as computing device 1202 or processing systems such as processing system 1204) to implement techniques, modules, and examples described herein.

The techniques described herein may be supported by various configurations of computing device 1202 and are not limited to the specific examples of the techniques described herein. This functionality may also be implemented all or in part through use of a distributed system, such as over a "cloud" 1216 via a platform 1218. Cloud 1216 includes and is representative of a platform 1218 for resources 1220. Platform 1218 abstracts underlying functionality of hardware (e.g., servers) and software resources of cloud 1216. Resources 1220 may include applications, data, or applications and data that can be utilized while computer processing is executed on servers that are remote from computing device 1202. Resources 1220 can also include services provided over the Internet, through a subscriber network, such as a cellular or Wi-Fi network, or combinations thereof. Resources 1220 can include asset store 1022, which stores assets, such as videos, images, photographs (e.g., user images in a gallery, a database of stock photographs, and the like), document templates, document designs, document object models, design files, review documents, user profile data, user image libraries, photographs posted in a shared photo service, animation sequences, digital images, metadata of assets, and the like, and may be accessed by computing device 1202.

Generally, resources 1220 may be licensed, purchased, or may be made freely available, (e.g., without authentication, license, or account-based access). The resources 1220 can include any suitable combination of services and content, such as a document review service, a video-editing service, an on-line shopping service, an image editing service, an artwork drawing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets as described above, including document designs and review documents.

Platform 1218 may abstract resources and functions to connect computing device 1202 with other computing devices. Platform 1218 may also serve to abstract scaling of resources to provide a corresponding level of scale to encountered demand for resources 1220 that are implemented via platform 1218. Accordingly, in an interconnected device embodiment, implementation of functionality described herein may be distributed throughout system 1200. For example, the functionality may be implemented in part on computing device 1202 as well as via platform 1218 that abstracts the functionality of cloud 1216.

Conclusion

In one or more implementations, a digital medium environment includes at least one computing device. Systems, devices, and techniques are described herein for reviewing document designs. A document review system is implemented for bidirectional commenting between a design application used to author a document design and a review application used to provide reviewer comments on a review document generated from the document design, such as a PDF document. A designer may author the document design in the design application and use the document review system to export the document design and generate the review document. A reviewer may make reviewer comments to the review document via the review application, and the document review system can import the reviewer comments into the design application. The designer can add comments from within the design application, including reply comments to the reviewer comments and designer comments that can be separate from a reviewer comment. Comments can include a free-form drawing on a document design, e.g., a path drawn via a mouse or drawing tool, or a designation of a point, and an indication of a text range in the document design, such as a highlight, strike-through, or underline of text in the text range. When the document review system exports the document design to the review document, the comment hierarchy is preserved, including sequences of comments and links between the comments. The document review system can also map the text ranges and free-form drawings from a coordinate system of the design application to a coordinate system of the review document, so that annotations from the document design are accurately represented in the review document. Moreover, the document review system can be implemented as an on-line system that operates in real time, allowing a designer to author a document design via a design application and a reviewer to concurrently review a review document corresponding to the document design via a review application.

Although implementations of reviewing document designs have been described in language specific to features and/or methods, the appended claims are not necessarily limited to the specific features or methods described. Rather, the specific features and methods are disclosed as example implementations of reviewing document designs, and other equivalent features and methods are intended to be within the scope of the appended claims. Further, various different examples are described and it is to be appreciated that each described example can be implemented independently or in connection with one or more other described examples.

What is claimed is:

1. In a digital medium environment for reviewing document designs, a method implemented by a computing device, the method comprising:

importing, to a document design generated by a design application implemented on the computing device, a reviewer comment about the document design made via a review application implemented on an additional computing device;

adding, via the design application, a reply comment to the reviewer comment as part of a comment hierarchy in the document design that indicates comment sequences and comment links for the document design;

generating, via the design application, a file in a file format that is viewable with the review application and not viewable with the design application, the file representing the document design and preserving the comment hierarchy in the document design;

generating, via the design application, conversion data that describes conversion of a coordinate position of the reply comment in the document design based on a first coordinate system used by the design application into a coordinate position that describes a position of the reply comment based on a second, different coordinate system used by the review application, said generating including generating a transformation matrix for converting coordinate positions in the first coordinate system to coordinate positions in the second coordinate system, constructing a vector from coordinates of a point on the reply comment, and multiplying the vector by the transformation matrix to generate the coordinate position of the reply comment in the second coordinate system; and exporting the file and the conversion data to the review application.

2. The method as described in claim 1, further comprising displaying the comment hierarchy with a link annotation between the reply comment and the reviewer comment.

3. The method as described in claim 1, further comprising adding, via the design application, a designer comment as part of the comment hierarchy in the document design.

4. The method as described in claim 3, wherein the designer comment includes a free-form drawing; and the exporting comprises:

extracting one or more path points of the free-form drawing from the design application; and converting the one or more path points from the first coordinate system used by the design application to the second coordinate system usable by the review application.

5. The method as described in claim 3, wherein the designer comment includes an indication of a text range of the document design; and
the exporting comprises for each line of text in the text range:
determining sets of continuous characters having a same font height;
determining bounding boxes for the sets of continuous characters; and
converting coordinates of corners of the bounding boxes from the first coordinate system used by the design application to the second coordinate system usable by the review application.

6. The method as described in claim 5, wherein the exporting further comprises:
providing the coordinates of the corners of the bounding boxes resulting from the converting to an application protocol interface (API); and
executing the API to generate the file representing the document design.

7. The method as described in claim 5, wherein the exporting further comprises:
determining a current page of the file;
determining, based on the coordinates of the corners of the bounding boxes resulting from the converting, one or more of the bounding boxes not on the current page; and
discarding the coordinates of the corners of the bounding boxes resulting from the converting for the one or more bounding boxes to prevent comment duplication.

8. The method as described in claim 3, wherein the designer comment includes:
an indication of a text range of the document design; and
at least one of a strike-through, an underline, or a highlight of text in the text range.

9. The method as described in claim 1, wherein the exporting comprises populating a reply field of the file that links the reply comment to the reviewer comment as a reply.

10. The method as described in claim 1, wherein the importing comprises:
associating the reviewer comment with a destination of the document design in the design application, the destination denoted by an indicator of at least one of a page, an object displayable in the document design, or text of the document design; and
storing the reviewer comment and the destination as part of a document object model of the document design.

11. The method as described in claim 1, wherein the importing and the exporting comprise communicating the comments of the comment hierarchy between the design application and the review application via a web interface to implement an online review.

12. A document review system comprising:
a memory storing a document and a document design that defines a layout of the document; and
at least one processor implemented to execute a design application to:
import a reviewer comment about the document design made via a review application implemented on an additional computing device;
add a reply comment to the reviewer comment as part of a comment hierarchy in the document design that indicates comment sequences and comment links for the document design;
generate a file in a file format that is viewable with the review application and not viewable with the design application, the file representing the document design and preserving the comment hierarchy in the document design;
generate conversion data that describes conversion of a coordinate position of the reply comment in the document design based on a first coordinate system used by the design application into a coordinate position that describes a position of the reply comment based on a second, different coordinate system used by the review application, including to generate a transformation matrix for converting coordinate positions in the first coordinate system to coordinate positions in the second coordinate system, construct a vector from coordinates of a point on the reply comment, and multiply the vector by the transformation matrix to generate the coordinate position of the reply comment in the second coordinate system; and
export the file and the conversion data to the review application.

13. The document review system as described in claim 12, wherein the design application is further implemented to add a designer comment as part of the comment hierarchy in the document design.

14. The document review system as described in claim 13, wherein the designer comment includes a free-form drawing; and
to export the file and the conversion data comprises to:
extract one or more path points of the free-form drawing from the design application; and
convert the one or more path points from the first coordinate system used by the design application to the second coordinate system usable by the review application.

15. The document review system as described in claim 13, wherein the designer comment includes an indication of a text range of the document design; and
to export the file and the conversion data comprises for each line of text in the text range:
determine sets of continuous characters having a same font height;
determine bounding boxes for the sets of continuous characters; and
convert coordinates of corners of the bounding boxes from the first coordinate system used by the design application to the second coordinate system usable by the review application.

16. The document review system as described in claim 15, wherein to export the file and the conversion data further comprises to:
provide the coordinates of the corners of the bounding boxes resulting from the converting to an application protocol interface (API); and
execute the API to generate the file representing the document design.

17. In a document review environment, a system comprising:
at least one processor implemented on at least one computing device; and
an import module executable by the at least one processor to import a reviewer comment about a document design made via a review application implemented on an additional computing device;
a comment module executable by the at least one processor to add a reply comment to the reviewer comment as part of a comment hierarchy in the document design that indicates comment sequences and comment links for the document design;

a document design module executable by the at least one processor to generate a file in a file format that is viewable with the review application and not viewable with the design application, the file representing the document design and preserving the comment hierarchy in the document design;

an export module executable by the at least one processor to:

generate conversion data that describes conversion of a coordinate position of the reply comment in the document design based on a first coordinate system used by the design application into a coordinate position that describes a position of the reply comment based on a second, different coordinate system used by the review application, including to generate a transformation matrix for converting coordinate positions in the first coordinate system to coordinate positions in the second coordinate system, construct a vector from coordinates of a point on the reply comment, and multiply the vector by the transformation matrix to generate the coordinate position of the reply comment in the second coordinate system; and export the file and the conversion data to the review application.

18. The document review system as described in claim 17, wherein the comment module is further executable by the at least one processor to add a designer comment including a free-form drawing as part of the comment hierarchy in the document design, and wherein the export module is further executable by the at least one processor to:

extract one or more path points of the free-form drawing from the design application; and convert the one or more path points from the first coordinate system used by the design application to the second coordinate system usable by the review application.

19. The document review system as described in claim 17, wherein the comment module is further executable by the at least one processor to add a designer comment including an indication of a text range of the document design, and wherein the export module is further executable by the at least one processor to for each line of text in the text range:

determine sets of continuous characters having a same font height;

determine bounding boxes for the sets of continuous characters; and convert coordinates of corners of the bounding boxes from the first coordinate system used by the design application to the second coordinate system usable by the review application.

20. The document review system as described in claim 19, wherein to export the file and the conversion data further comprises executing the export module by the at least one processor to:

provide the coordinates of the corners of the bounding boxes resulting from the converting to an application protocol interface (API); and execute the API to generate the file representing the document design.

\* \* \* \* \*